United States Patent
Kim et al.

(10) Patent No.: US 10,306,406 B2
(45) Date of Patent: May 28, 2019

(54) METHOD FOR OBTAINING LOCATION INFORMATION AND ELECTRONIC DEVICE THEREOF

(71) Applicant: Samsung Electronics Co., Ltd., Gyeonggi-do (KR)

(72) Inventors: Woo-Young Kim, Gyeonggi-do (KR); Sunggyu Lee, Gyeonggi-do (KR); Areum Choi, Gyeonggi-do (KR); Jeong-Min Park, Gyeonggi-do (KR); Jae-Woong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/016,855

(22) Filed: Feb. 5, 2016

(65) Prior Publication Data

US 2016/0234642 A1 Aug. 11, 2016

(30) Foreign Application Priority Data

Feb. 5, 2015 (KR) .................. 10-2015-0017948

(51) Int. Cl.
*H04W 4/02* (2018.01)
*G01S 19/34* (2010.01)
(Continued)

(52) U.S. Cl.
CPC ............ *H04W 4/023* (2013.01); *G01S 19/13* (2013.01); *G01S 19/34* (2013.01); *H04W 4/027* (2013.01);
(Continued)

(58) Field of Classification Search
CPC . H04W 4/023; H04W 4/027; H04W 52/0209; G01S 19/13; G01S 19/34;
(Continued)

(56) References Cited

U.S. PATENT DOCUMENTS

| | | | |
|---|---|---|---|
| 2007/0161380 A1* | 7/2007 | Fok | G01S 5/0009 455/456.1 |
| 2009/0192709 A1 | 7/2009 | Yonker et al. | |

(Continued)

FOREIGN PATENT DOCUMENTS

| EP | 2 180 335 | 4/2010 |
|---|---|---|
| KR | 1020060005915 | 1/2006 |
| KR | 100872071 | 12/2008 |

OTHER PUBLICATIONS

International Search Report dated Jun. 2, 2016 issued in counterpart application No. PCT/KR2016/001227, 11 pages.
(Continued)

*Primary Examiner* — Quoc Thai N Vu
(74) *Attorney, Agent, or Firm* — The Farrell Law Firm, P.C.

(57) ABSTRACT

An electronic device and a method of the electronic device are provided. The electronic device includes a location measurement module configured to measure a location; a memory configured to store an application program; and a processor electrically connected to the location measurement module and the memory, wherein the memory stores instructions that, when executed, cause the processor to store location information obtained by the location measurement module in the memory, process a request from the application program to obtain location information, and, in response to the request to obtain location information, provide the stored location information to the application program based on at least part of the location information stored in the memory.

10 Claims, 15 Drawing Sheets

(51) Int. Cl.
*G01S 19/13* (2010.01)
*H04W 52/02* (2009.01)
*G01S 19/39* (2010.01)
*G01S 19/48* (2010.01)
*G01S 5/02* (2010.01)

(52) U.S. Cl.
CPC ........... *H04W 52/0209* (2013.01); *G01S 5/02* (2013.01); *G01S 19/39* (2013.01); *G01S 19/48* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC . G01S 19/39; G01S 19/48; G01S 5/02; Y02D 70/00; Y02D 70/1242; Y02D 70/1262; Y02D 70/142; Y02D 70/144; Y02D 70/164; Y02D 70/166; Y02D 70/168; Y02D 70/26
USPC ......... 455/404.2, 414.2, 456.1, 456.2, 456.3, 455/456.6, 457
See application file for complete search history.

(56) References Cited

U.S. PATENT DOCUMENTS

| | | |
|---|---|---|
| 2009/0209267 A1 | 8/2009 | Jagetiya |
| 2011/0140956 A1* | 6/2011 | Henry ............... G01S 19/34 342/357.3 |
| 2011/0184646 A1* | 7/2011 | Wong ............... G01S 5/0284 701/300 |
| 2013/0316725 A1 | 11/2013 | MacGougan et al. |
| 2014/0024354 A1 | 1/2014 | Haik et al. |
| 2014/0057656 A1* | 2/2014 | Hasegawa ............ G01S 5/02 455/456.2 |
| 2014/0274009 A1* | 9/2014 | Do ..................... H04W 8/18 455/418 |
| 2014/0309963 A1 | 10/2014 | Tsukamoto et al. |
| 2015/0296343 A1* | 10/2015 | Weiss ................ H04W 4/027 455/456.1 |

OTHER PUBLICATIONS

European Search Report dated Jul. 5, 2016 issued in counterpart application No. 16154328.5-1812, 10 pages.
European Search Report dated Dec. 13, 2018 issued in counterpart application No. 16154328.5-1206, 7 pages.

* cited by examiner

METHOD FOR OBTAINING LOCATION INFORMATION AND ELECTRONIC DEVICE THEREOF

PRIORITY

This application claims priority under 35 U.S.C. § 119(a) to a Korean Patent Application filed in the Korean Intellectual Property Office on Feb. 5, 2015 and assigned Serial No. 10-2015-0017948, the contents of which are incorporated herein by reference.

BACKGROUND

1. Technical Field

The present disclosure relates generally to an apparatus and method for obtaining location information in an electronic device, and more particularly, to an apparatus and method for obtaining location information in an electronic device with reduced power consumption.

2. Description of the Related Art

Electronic devices are able to measure locations using location measurement methods such as a global navigation satellite system (GNSS), a network location provider (NLP), pedestrian dead-reckoning (PDR) using an inertia sensor, etc. For example, if an application program (for example, a weather application program, a map application program etc.) requires location information, an electronic device may measure its location information using at least one of the above-mentioned location measurement methods.

If an electronic device measures its location as an application program demands, the electronic device should use hardware resources (for example, an inertia sensor) to measure the location even if there is no great change in the location of the electronic device. Therefore, the electronic device consumes the same amount of power for any location measurement.

SUMMARY

An aspect of the present disclosure provides an apparatus and method for reducing power consumption required to obtain location information in an electronic device.

Another aspect of the present disclosure provides an apparatus and method for selectively measuring a location of an electronic device based on a pre-set passive location of the electronic device in the electronic device.

According to an aspect of the present disclosure, an electronic device is provided. The electronic device includes a location measurement module configured to measure a location; a memory configured to store an application program; and a processor electrically connected to the location measurement module and the memory, wherein the memory stores instructions that, when executed, cause the processor to store location information obtained by the location measurement module in the memory, process a request from the application program to obtain location information, and, in response to the request to obtain location information, provide the stored location information to the application program based on at least part of the location information stored in the memory.

According to another aspect of the present disclosure, an electronic device is provided. The electronic device includes a location measurement module configured to measure a location; a memory configured to store a first application program and a second application program; and a processor electrically connected to the location measurement module and the memory, wherein the memory stores instructions that, when executed, causes the processor, when being executed, to process a request from the first application program to obtain first location information, obtain location information using the location measurement module in response to the request to obtain the first location information, store the location information obtained by the location measurement module in the memory, process a request from the second application program to obtain second location information, and, in response to the request to obtain the second location information, provide the stored location information to the second application program based on at least part of the stored location information.

According to another aspect of the present disclosure, a method of an electronic device is provided. The method includes storing location information of the electronic device in a memory of the electronic device; and, providing, in response to a request of an application program to obtain location information, the location information stored in the memory to the application program based on at least part of the location information stored in the memory.

According to another aspect of the present disclosure, a method of an electronic device is provided. The method includes, obtaining, in response to a request from a first application program to obtain first location information, location information of the electronic device; storing the location information of the electronic device in a memory of the electronic device; and, providing, in response to a request from a second application program to obtain second location information, the stored location information to the second application program based on at least part of the stored location information.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
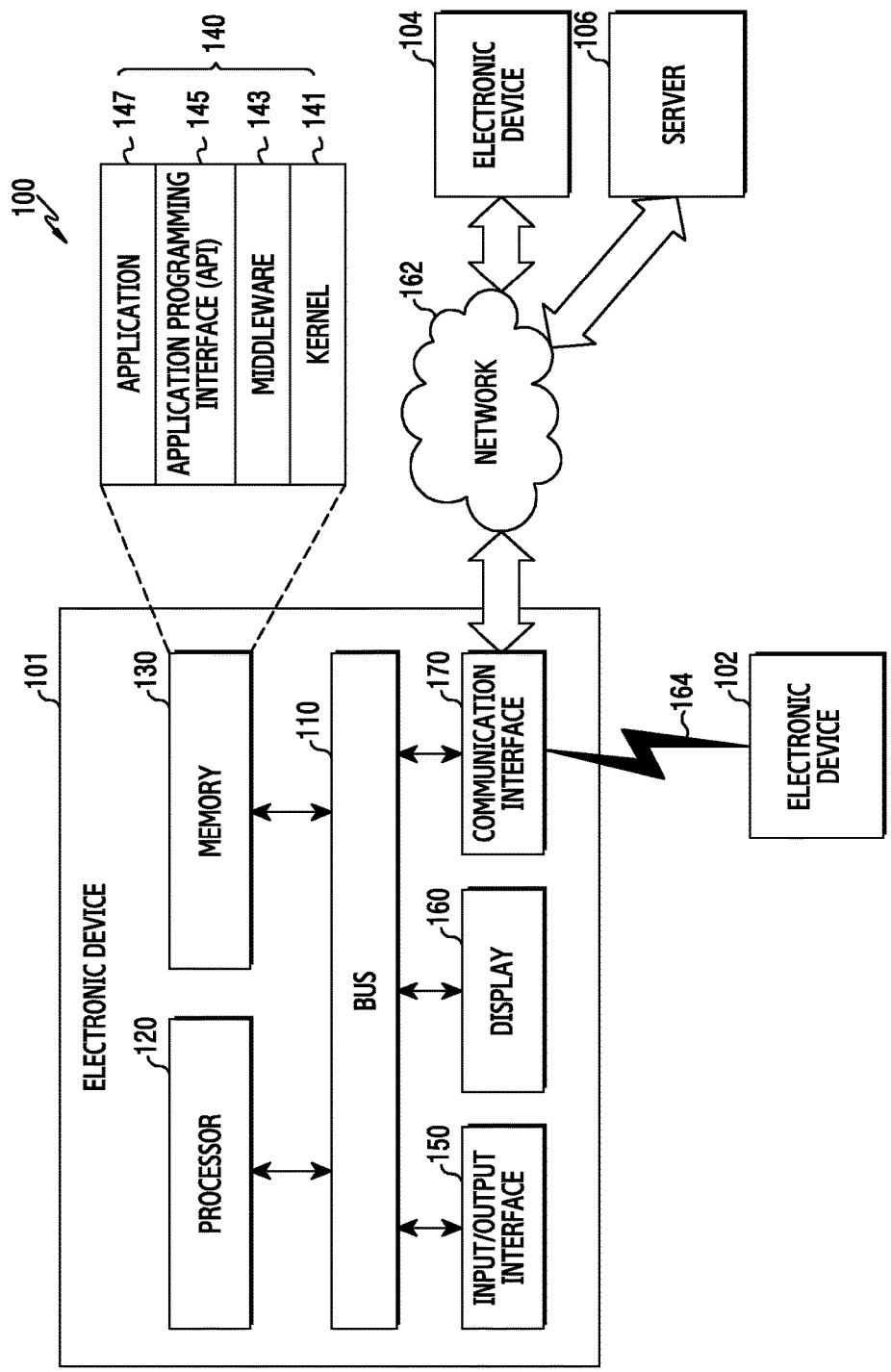
FIG. 1 is a block diagram of an electronic device in a network environment according to an embodiment of the present disclosure.

Hereinafter, various embodiments of the present disclosure are described with reference to the accompanying drawings. In the following description, certain details such as detailed configuration and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure is described in detail with reference to certain embodiments of the present disclosure shown in the accompanying drawings. However, it should be understood that the present disclosure is not limited to the embodiments disclosed herein, but includes all modifications/changes, equivalents, and/or alternatives falling within the scope and spirit of the present disclosure. In describing the accompanying drawings, similar reference numerals may be used to designate similar elements.

The terms "have," "may have," "include," or "may include" used in the present disclosure indicate the presence of disclosed corresponding functions, operations, elements, and the like, and do not limit additional one or more functions, operations, elements, and the like. In addition, it should be understood that the terms "include" and "have" used in the present disclosure indicate the presence of features, numbers, step operations, operations, elements, parts, or a combination thereof described in the present disclosure, but do not preclude the presence or addition of one or more other features, numbers, steps, operations, elements, parts, or a combination thereof.

The terms "A or B," "at least one of A and/or B" or "one or more of A and/or B" used in an embodiment of the present disclosure include any and all combinations of words enumerated with it. For example, "A or B," "at least one of A and B" or "at least one of A or B" indicate (1) including at least one A, (2) including at least one B, or (3) including at least one A and at least one B.

Although the term such as "first" and "second" used in the present disclosure may modify various elements of an embodiment of the present disclosure, these terms are not intended to limit the corresponding elements. For example, the terms do not limit an order and/or importance of the corresponding elements. The terms may be used for the purpose of distinguishing one element from another element. For example, a first user device and a second user device each indicate user devices and may indicate different user devices. For example, a first element may be referred to as a second element without departing from the scope and spirit of the present disclosure, and similarly, a second element may be referred to as a first element.

It will be understood that when an element (e.g., a first element) is "connected to" or "(operatively or communicatively) coupled with/to" another element (e.g., a second element), the element may be directly connected or coupled to the other element, and there may be an intervening element (e.g., a third element) between the element and the other element. In contrast, it will be understood that when an element (e.g., a first element) is "directly connected" or "directly coupled" to another element (e.g., a second element), there is no intervening element (e.g., a third element) between the element and the other element.

The expression "configured (or set) to" used in the present disclosure may be replaced with "suitable for," "having the capacity to," "designed to," "adapted to," "made to," or "capable of" according to a certain situation. The term "configured (or set) to" does not necessarily indicate "specifically designed to" in hardware. Instead, the expression "apparatus configured to . . . " may indicate that the apparatus is "capable of . . . " along with other devices or parts in a certain situation. For example, "a processor configured (or set) to perform A, B, and C" may be a dedicated processor, e.g., an embedded processor, for performing a corresponding operation, or a general-purpose processor, e.g., a central processing unit (CPU) or an application processor (AP), capable of performing a corresponding operation by executing one or more software programs stored in a memory device.

The terms as used herein are used merely to describe certain embodiments of the present disclosure and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in an embodiment of the present disclosure.

An electronic device according to an embodiment of the present disclosure may be a device. For example, an electronic device according to an embodiment of the present disclosure may include at least one of a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); a moving picture experts group audio layer 3 (MP3) player; a mobile medical device; a camera; a power source; or a wearable device (e.g., a head-mount-device (HMD), electronic glasses, electronic clothing, an electronic bracelet, an electronic necklace, an electronic appcessory, an electronic tattoo, a smart mirror, or a smart watch).

In an embodiment of the present disclosure, an electronic device may be a home appliance. For example, an appliance may include at least one of a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In an embodiment of the present disclosure, an electronic device may include at least one of a medical equipment (e.g., a mobile medical device (e.g., a blood glucose monitoring device, a heart rate monitor, a blood pressure monitoring device or a thermometer), a magnetic resonance angiography (MRA) machine, a magnetic resonance imaging (MRI) machine, a computed tomography (CT) scanner, or an ultrasound machine); a navigation device; a GNSS; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for a vehicle; an industrial or home robot; an automated teller machine (ATM) of a financial institution, a point of sale (POS) device at a retail store, or an Internet of Things (TOT) device (e.g., a light bulb, various sensors, an electronic meter, a gas meter, a sprinkler, a fire alarm, a thermostat, a streetlamp, a toaster, sports equipment, a hot-water tank, a heater, or a boiler and the like).

In an embodiment of the present disclosure, an electronic device may include at least one of a piece of furniture or a building/structure; an electronic board; an electronic signature receiving device; a projector; and various measuring instruments (e.g., a water meter, an electricity meter, a gas meter, or a wave meter). Further, it will be apparent to those skilled in the art that an electronic device according to an embodiment of the present disclosure is not limited to the above-mentioned devices.

Herein, the term "user" may indicate a person who uses an electronic device or a device (e.g., an artificial intelligence electronic device) that uses the electronic device.

FIG. 1 is a block diagram of an electronic device 101 in a network environment 100 according to an embodiment of the present disclosure.

The electronic device 101 in the network environment 100, according to an embodiment of the present disclosure, is described below with reference to FIG. 1. The electronic device 101 may include a bus 110, a processor (e.g., including processing circuitry) 120, a memory 130, an input/output interface (e.g., including input/output circuitry) 150, a display (e.g., including a display panel and display circuitry) 160, and a communication interface (e.g., including communication circuitry) 170. At least one of the elements of the electronic device 101 may be omitted or other elements may be additionally included.

The bus 110 may include, for example, a circuit that interconnects the elements 110 to 170 and transfers communication (e.g., a control message and/or data) between the elements 110 to 170.

The processor 120 may include one or more of a CPU, an AP, and a communication processor (CP). The processor 120 may, for example, perform an operation or process data under control of and/or in communication with at least one other element of the electronic device 101.

The memory 130 may include a volatile memory and/or a non-volatile memory. The memory 130 may store, for example, instructions or data (e.g. pre-stored location information, location information matched with a network) relevant to at least one other element of the electronic device 101. According to an embodiment of the present disclosure, the memory 130 may store software and/or a program 140. For example, the program 140 may include a kernel 141, middleware 143, an application programming interface (API) 145, and an application (or "application program") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147. For example, the middleware 143 may perform scheduling or load balancing on the one or more task requests by processing the one or more task requests according to the priorities assigned thereto.

The API 145 is an interface through which the application 147 controls functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a liquid crystal display (LCD), a light-emitting diode (LED) display, an organic light-emitting diode (OLED) display, a microelectromechanical systems (MEMS) display, and an electronic paper display. The display 160, for example, may display various types of content (e.g., text, images, videos, icons, or symbols) to a user. The display 160 may include a touch screen and receive, for example, a touch, gesture, proximity, or hovering input using an electronic pen or a part of a user's body.

The communication interface 170, for example, may establish communication between the electronic device 101 and the first external electronic device 102, the second external electronic device 104, or a server 106. For example, the communication interface 170 may be connected to a network 162 through wireless or wired communication to communicate with the second external electronic device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may be performed by using at least one of, for example, wireless fidelity (WiFi), Bluetooth, near field communication (NFC), and GNSS. The GNSS may include at least one of, for example, a global positioning system (GPS), a global navigation satellite system (Glonass), a BeiDou navigation satellite system (BeiDou), and European global satellite-based navigation system Galileo. Hereinafter, "GPS" may be interchangeably used with "GNSS." The wired communication may include at least one of, for example, a universal serial bus (USB), a high definition multimedia interface (HDMI), recommended standard 232 (RS-232), and a plain old telephone service (POTS). The network 162 may include at least one of a communication network such as a computer network (e.g., a local area network (LAN) or a wide area network (WAN)), the Internet, and a telephone network.

Each of the first and second external electronic devices 102 and 104 may be of a type identical to or different from that of the electronic device 101. According to an embodiment of the present disclosure, the server 106 may include a group of one or more servers. All or some of the operations performed in the electronic device 101 may be performed in another electronic device or a plurality of electronic devices (e.g., the electronic devices 102 and 104 or the server 106). If the electronic device 101 is tasked to perform some functions or services automatically or in response to a request, the electronic device 101 may make a request for performing at least some functions relating thereto to the electronic device 102 or 104 or the server 106 instead of performing the functions or services itself. The electronic device 102 or 104 or the server 106 may execute the requested functions or the additional functions, and may provide the results to the electronic device 101. The electronic device 101 may process the received results as is or additionally process the results to provide the requested functions or services. To achieve this, for example, cloud computing, distributed computing, or client-server computing technology may be used.

Figure 2:
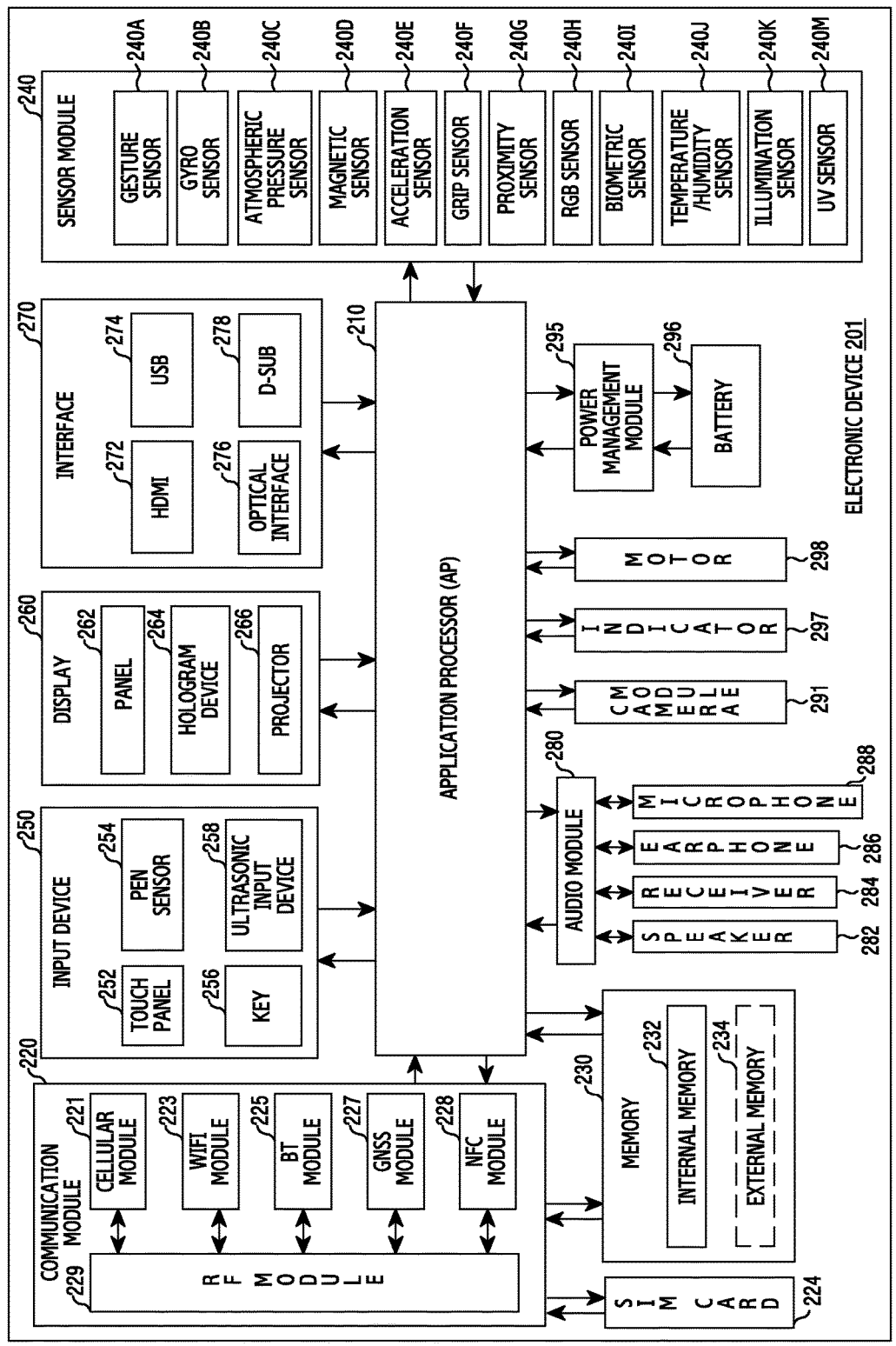
FIG. 2 is a block diagram of an electronic device according to an embodiment of the present disclosure.

FIG. 2 is a block diagram of an electronic device 201 according to an embodiment of the present disclosure. The electronic device 201 may include, for example, all or a part of the electronic device 101 illustrated in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, a system on chip (SoC). The AP 210 may further include a graphics processing unit (GPU) and/or an image signal processor. The AP 210 may include at least some of the elements (e.g., a cellular module 221) illustrated in FIG. 2. The AP 210 may load commands or data, received from at least one other element (e.g., a non-volatile memory), into a volatile memory to process the loaded commands or data, and may store various types of data in the non-volatile memory.

The communication module 220 may be configured the same as or similar to the communication interface 170 of FIG. 1. The communication module 220 may include, for example, the cellular module 221, a WiFi module 223, a BT module 225, a GNSS module 227, an NFC module 228, and a radio frequency (RF) module 229. The communication module 220 provides a function of transmitting/receiving a signal. Accordingly, the communication module 220 may be referred to as a "reception unit," a "transmission unit," a "transmission and reception unit," a "communication unit," or the like.

The cellular module 221 may provide, for example, a voice call, a video call, a text message service, or an Internet service through a communication network. According to an embodiment of the present disclosure, the cellular module 221 may distinguish and authenticate the electronic device 201 in the communication network by using the SIM card 224. The cellular module 221 may perform at least some of the functions that the AP 210 may provide. The cellular module 221 may include a communication processor (CP).

The WiFi module 223, the BT module 225, the GNSS module 227, or the NFC module 228 may include, for example, a processor for processing data transmitted/received through the corresponding module. According to an embodiment of the present disclosure, at least some (e.g., two or more) of the cellular module 221, the WiFi module 223, the BT module 225, the GNSS module 227, and the NFC module 228 may be included in a single integrated circuit (IC) or chip or IC package.

The RF module 229 may, for example, transmit/receive a communication signal (e.g., an RF signal). The RF module 229 may include, for example, a transceiver, a power amplifier module (PAM), a frequency filter, a low noise amplifier (LNA), or an antenna. According to an embodiment of the present disclosure, at least one of the cellular module 221, the WiFi module 223, the BT module 225, the GNSS module 227, and the NFC module 228 may transmit/receive an RF signal through a separate RF module.

The SIM card 224 may include an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF) drive, a secure digital (SD) memory card, a micro secure digital (Micro-SD) memory card, a mini secure digital (Mini-SD) memory card, an extreme digital (xD) memory card, a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a red, green, and blue (RGB) sensor), a biometric sensor 240I, a temperature/humidity sensor 240J, a illumination sensor 240K, and a ultra violet (UV) sensor 240M. Additionally or alternatively, the sensor module 240 may include an electronic nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor that is configured as a part of the AP 210 or a separate element from the AP 210 in order to control the sensor module 240, thereby controlling the sensor module 240 while the AP 2710 is in a low power state (e.g. sleep state).

The input device 250 may include, for example, a touch panel 252, a (digital) pen sensor 254, a key 256, or an ultrasonic input device 258. The touch panel 252 may use at least one of, for example, a capacitive type panel, a resistive type panel, an infrared type panel, and an ultrasonic type panel. In addition, the touch panel 252 may further include a control circuit. The touch panel 252 may further include a tactile layer to provide a tactile reaction to a user.

The (digital) pen sensor 254 may be, for example, a part of the touch panel 252, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160 of FIG. 1) may include a panel 262, a hologram device 264, or a projector 266. The panel 262 may be configured the same as or similar to the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using the interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) connector 278. The interface 270 may be included in, for example, the communication interface 160 illustrated in FIG. 1. Additionally or alternatively, the interface 270 may include, for example, a mobile high-definition link (MHL) interface, an SD/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 150 illustrated in FIG. 1. The audio module 280 may, for example, process sound information that is input or output through the speaker 282, the receiver 284, the earphone 286, the microphone 288, or the like.

The camera module 291 may be, for example, a device that can take a still image or a moving image, and according to an embodiment of the present disclosure, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an embodiment of the present disclosure, the power management module 295 may include a power management IC (PMIC), a charger IC, or a battery gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, etc.) for wireless charging. The battery gauge may measure, for example, a residual quantity of the battery 296, and a voltage, a current, or a temperature during charging. The battery 296 may include, for example, a rechargeable battery and/or a solar battery.

The indicator 297 may indicate a certain state of the electronic device 201 or a part thereof (e.g., the AP 210), for example, a booting state, a message state, a charging state, or the like. The motor 298 may convert an electrical signal into a mechanical vibration, and may generate a vibration or haptic effect. The electronic device 201 may include a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device 201 according to the present disclosure may be implemented by one or more components and the name of the corresponding component may vary depending on a type of the electronic device 201. In an embodiment of the present disclosure, the electronic device 201 may include at least one of the above-described elements. Some of the above-described elements may be omitted from the electronic device 201, or the electronic device 201 may further include additional elements. Further, some of the elements of the electronic device 201 may be coupled to form a single entity while performing the same functions as those of the corresponding elements before the coupling.

Figure 3:
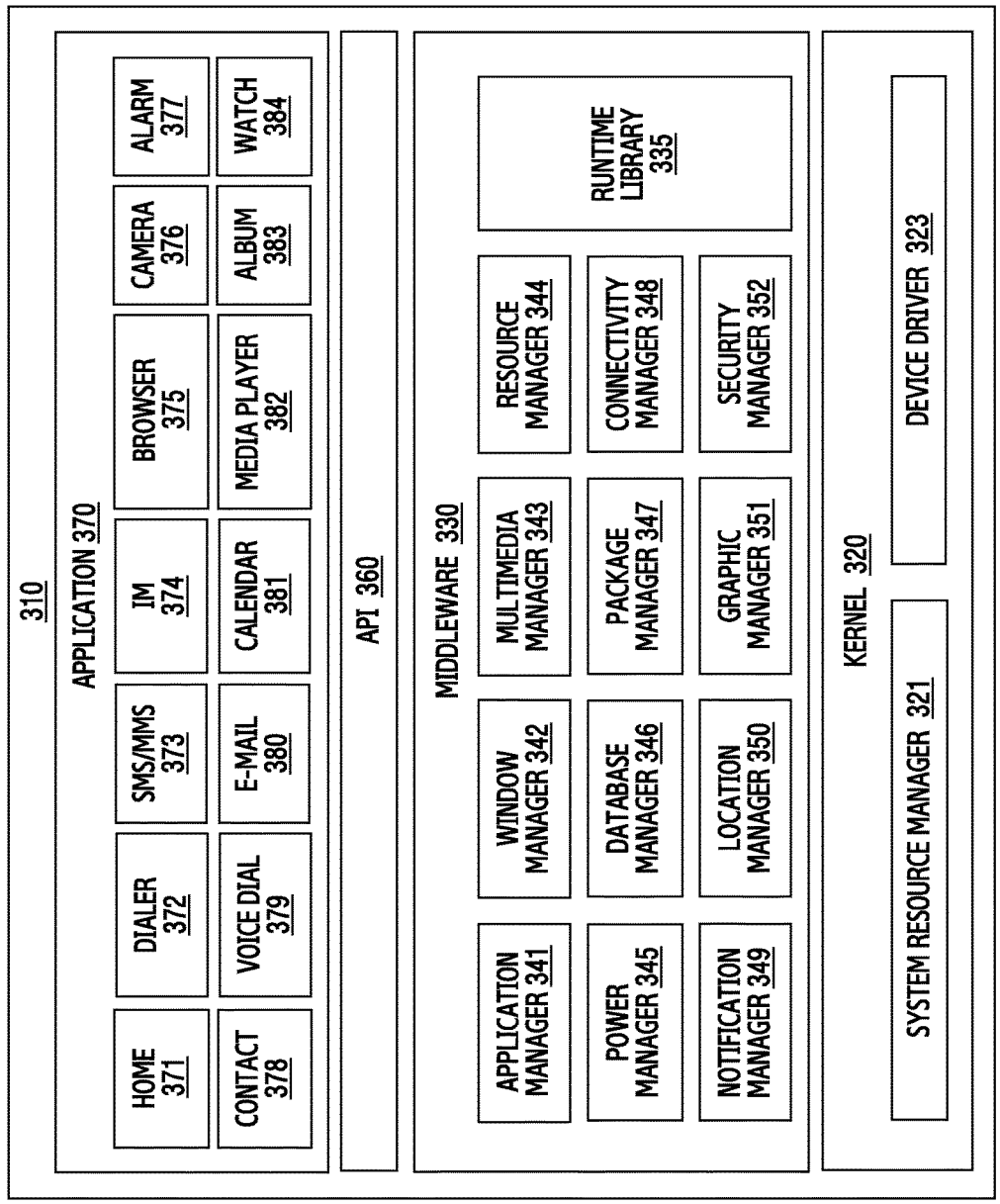
FIG. 3 is a block diagram of a program module according to an embodiment of the present disclosure.

FIG. 3 is a block diagram of a program module 310 according to an embodiment of the present disclosure. The program module 310 (e.g., the program 140 of FIG. 1) may include an OS that controls resources relating to an electronic device (e.g., the electronic device 101 of FIG. 1) and/or various applications (e.g., the application 147 of FIG. 1) executed in the OS. The operating system may be, for example, Android®, iOS®, Windows®, Symbian™, Tizen®, Bada™, or the like.

The programming module 310 may include a kernel 320, middleware 330, an API 360, and/or an application 370. At least some of the program module 310 may be preloaded in the electronic device 101 of FIG. 1, or may be downloaded from an external electronic device (e.g., the electronic devices 102 and 104, the server 106).

The kernel 320 (e.g., the kernel 141 of FIG. 1) may include, for example, a system resource manager 321 or a device driver 323. The system resource manager 321 may control, allocate, or collect system resources. According to an embodiment of the present disclosure, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a WiFi driver, an audio driver, or an inter-process communication (IPC) driver.

The middleware 330 may provide a function required in common by the application 370, or may provide various functions to the application 370 through the API 360 to enable the application 370 to efficiently use limited system resources in the electronic device 101 of FIG. 1. According to an embodiment of the present disclosure, the middleware 330 (e.g., the middleware 143 of FIG. 1) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier in order to add a new function through a programming language during the execution of the application 370. The run time library 335 may perform input/output management, memory management, or a function for an arithmetic function.

The application manager 341 may manage, for example, a life cycle of at least one of the applications of the application 370. The window manager 342 may manage graphical user interface (GUI) resources used by a screen. The multimedia manager 343 may identify a format required for reproducing various media files, and may encode or decode a media file using a codec suitable for the corresponding format. The resource manager 344 may manage resources of at least one of the applications of the application 370, such as source code, a memory, a storage space, and the like.

The power manager 345 may operate together with, for example, a basic input/output system (BIOS) to manage a battery or power and provide power information required for an operation of the electronic device 101 of FIG. 1. The database manager 346 may generate, search, or change a database to be used by at least one of the applications in the application 370. The package manager 347 may manage installation or an update of an application distributed in the format of a package file.

The connectivity manager 348 may manage, for example, a wireless connection, such as WiFi or Bluetooth. The notification manager 349 may display or notify of an event, such as a received message, an appointment, and a proximity notification, in such a manner as not to disturb a user. The location manager 350 may manage location information of the electronic device 101 of FIG. 1. The graphic manager 351 may manage a graphic effect to be provided to a user, or a user interface related thereto. The security manager 352 may provide all security functions required for system security or user authentication. According to an embodiment of the present disclosure, in cases where the electronic device (e.g., the electronic device 101 of FIG. 1) has a telephone call function, the middleware 330 may further include a telephony manager for managing a voice or video call function of the electronic device. The middleware 330 may further include a movement manager for identifying a kind of movement sensed by the electronic device (for example, stopping, walking, running, riding a bicycle, traveling in a vehicle, etc.) based on sensing data which is detected through at least one sensor included the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145 of FIG. 1) may be, for example, a set of API programming functions, and may be provided with different configurations according to operating systems. For example, in the case of Android® or iOS®, one API set may be provided for each platform, and in the case of Tizen®, two or more API sets may be provided for each platform.

The application 370 (e.g., the application 147 in FIG. 1) may include, for example, one or more applications that may provide functions, such as a home application 371, a dialer application 372, a short message service/multi-media messaging service (SMS/MMS) application 373, an instant message (IM) application 374, a browser application 375, a camera application 376, an alarm application 377, a contact application 378, a voice dialer application 379, an e-mail application 380, a calendar application 381, a media player application 382, an album application 383, a watch application 384, a health care application (e.g., to measure a quantity of exercise or a level of blood sugar), or an environmental information application (e.g., atmospheric pressure, humidity, or temperature information).

According to an embodiment of the present disclosure, the application 370 may include an application (hereinafter, "information exchange application") that supports information exchange between the electronic device (e.g., the electronic device 101 of FIG. 1) and external electronic devices 102 and 104. The information exchange application may include, for example, a notification relay application for transmitting certain information to the external electronic device 102 or 104, or a device management application for managing the external electronic device 102 or 104.

For example, the notification relay application may include a function of transferring, to an external electronic device 102 or 104, notification information generated from other applications of the electronic device 101 of FIG. 1 (e.g., an SMS/MMS application 373, an e-mail application 380, a health management application, or an environmental information application). Furthermore, the notification relay application may, for example, receive notification information from an external electronic device 102 or 104 and provide the received notification information to a user. The device management application may, for example, manage (e.g., install, delete, or update) at least one function of an external electronic device 102 or 104 communicating with the electronic device 101 (for example, a function of turning on/off the external electronic device 101 (or some elements thereof), or a function of adjusting luminance (or resolution) of the display 160 of FIG. 1), applications operating in the external electronic device 102 or 104, or services provided by the external electronic device 102 or 104 (e.g., a telephone call service or a message service).

According to an embodiment of the present disclosure, the application 370 may include an application (e.g., a health care application) specified according to attributes (e.g., attributes of the electronic device 101 of FIG. 1 such as the type of electronic device 101 which corresponds to a mobile medical device) of the external electronic device 102 or 104. The application 370 may include an application received from the server 106 or the electronic device 102 or 104. The application 370 may include a preloaded application or a third party application that can be downloaded from a server. The names of the elements of the program module 310, according to FIG. 3, may vary according to the type of operating system.

According to an embodiment of the present disclosure, at least a part of the programming module 310 may be implemented in software, firmware, hardware, or a combination of two or more thereof. At least some of the programming module 310 may be implemented (for example, executed) by, for example, the AP 210. At least some of the programming module 310 may include, for example, a module, a program, a routine, a set of instructions, a process, or the like for performing one or more functions.

The term "module" as used herein may, for example, indicate a unit including one of hardware, software, and firmware or a combination of two or more of them. The term "module" may be interchangeably used with, for example, the terms "unit," "logic," "logical block," "component," or "circuit." The term "module" may indicate a minimum unit of an integrated component element or a part thereof. The term "module" may indicate a minimum unit for performing one or more functions or a part thereof. The term "module" may indicate an entity that may be mechanically or electronically implemented. For example, the term "module" according to the present disclosure may include at least one of an application-specific IC (ASIC), a field-programmable gate array (FPGA), and a programmable-logic device for performing operations which are known or will be developed.

According to an embodiment of the present disclosure, at least some of the devices (for example, modules or functions thereof) or the method (for example, operations) may be implemented by a command stored in a non-transitory computer-readable storage medium in a programming module form. When an instruction is implemented by one or more processors (for example, the processor 120 of FIG. 1), one or more processors may execute a function corresponding to the instruction. The non-transitory computer-readable storage medium may be, for example, the memory 130 of FIG. 1.

The non-transitory computer-readable storage medium may include a hard disk, a floppy disk, magnetic media (for example, a magnetic tape), optical media (for example, a compact disc read only memory (CD-ROM) and a digital versatile disc (DVD)), magneto-optical media (for example, a floptical disk), a hardware device (for example, a ROM, a random access memory (RAM), a flash memory), and the like. In addition, the program instructions may include high level language code, which can be executed in a computer by using an interpreter, as well as machine readable object code generated by a compiler. Any of the hardware devices as described above may be configured to work as one or more software modules in order to perform the operations according to an embodiment of the present disclosure, and vice versa.

Any of the modules or programming modules according to an embodiment of the present disclosure may include at least one of the above described elements, exclude some of the elements, or further include other additional elements. The operations performed by the modules, programming module, or other elements according to an embodiment of the present disclosure may be executed in a sequential, parallel, repetitive, or heuristic manner. Further, some operations may be executed according to another order or may be omitted, or other operations may be added.

Figure 4:
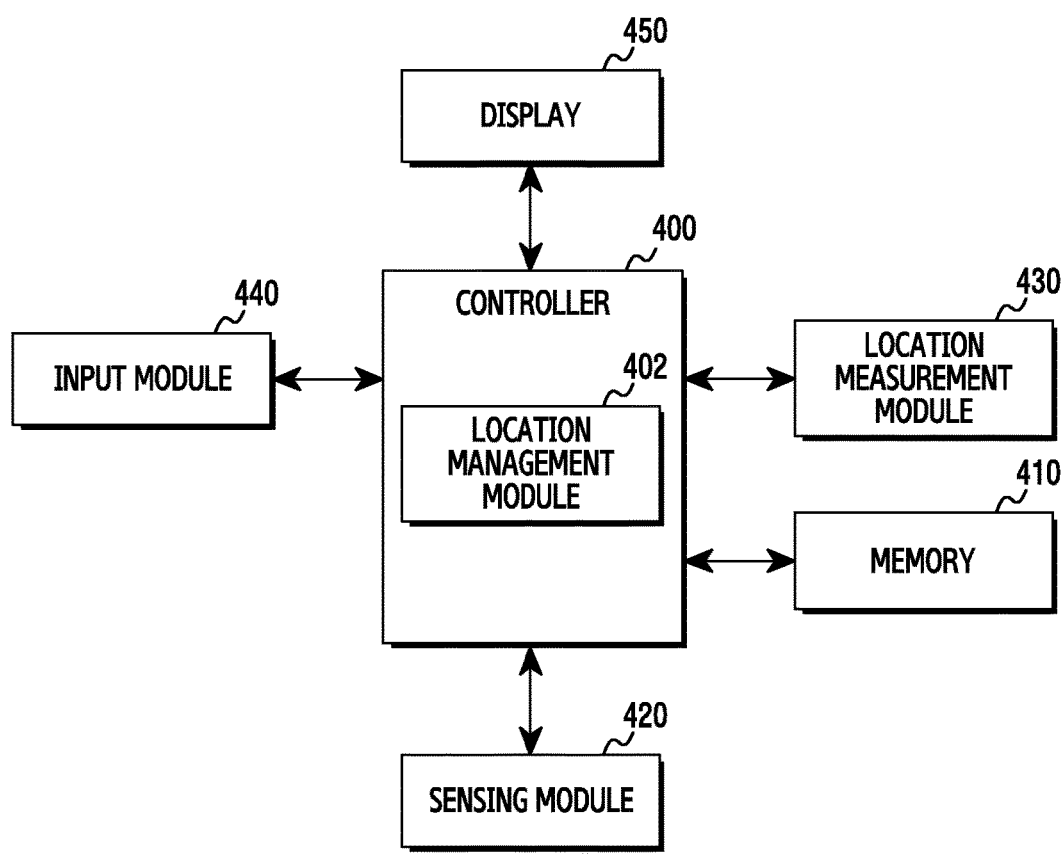
FIG. 4 is a block diagram of an electronic device for obtaining location information according to an embodiment of the present disclosure.

FIG. 4 is a block diagram of an electronic device for obtaining location information according to an embodiment of the present disclosure.

Referring to FIG. 4, the electronic device (for example, the electronic device 101 of FIG. 1) may include a controller (e.g., including processing circuitry) 400, a memory 410, a sensing module (e.g., including at least one sensor including sensor circuitry) 420, a location measurement module (e.g., including location measurement circuitry) 430, an input module (e.g., including input circuitry) 440, and a display (e.g., including a display panel and display circuitry) 450.

The controller 400 (for example, the processor 120 of FIG. 1) may include one or more of a CPU, an AP, or a CP.

The controller 400 may obtain location information of the electronic device through a location management module 402.

According to an embodiment of the present disclosure, the location management module 402 may control the location measurement module 430 to selectively measure a location based on reliability of location information (for example, a passive location) pre-stored in the memory 410. For example, if the pre-stored location information is determined to be reliable, the location management module 402 may provide the pre-stored location information to an application program which requires location information. For example, if the pre-stored location information is not determined to be reliable, the location management module 402 may measure the location of the electronic device using the location measurement module 430.

According to an embodiment of the present disclosure, the location management module 402 may determine whether the pre-stored location information is reliable or not based on an effective range of location information required by the application program. For example, the effective range of the location information required by the application program may be determined by the application program or the location management module 402. For example, the location management module 402 may determine the effective range of the location information required by the application program based on a characteristic of the application program which requires the location information (for example, the type or function of the application program). For example, the location management module 402 may determine the effective range of the location information which has been previously used by the application program as the effective range of the location information required by the application program. The effective range of the location information may represent a margin of error of location information (e.g. accuracy). For example, the effective range of the location information required by the application program may represent a margin of error of location information which is necessary for the application program to provide services.

According to an embodiment of the present disclosure, the location management module 402 may determine whether the pre-stored location information is reliable or not based on the effective range of the location information required by the application program and a measurement time of the pre-stored location information. For example, if the effective range of the pre-stored location information falls within the effective range of the location information required by the application program, and the measurement time of the pre-stored location information falls within an effective time range, the location management module 402 may determine that the pre-stored location information is reliable. On the other hand, if the effective range of the pre-stored location information exceeds the effective range of the location information required by the application program, the location management module 402 may determine that the pre-stored location information is not reliable. In addition, if the measurement time of the pre-stored location information exceeds the effective time range, the location management module 402 may determine that the pre-stored location information is not reliable. The effective range of the pre-stored location information may represent a margin of error of the pre-stored location information.

According to an embodiment of the present disclosure, the location management module 402 may determine whether the pre-stored location information is reliable or not based on an effective range of location information corresponding to movement information of the electronic device. For example, the location management module 402 may estimate the movement information (for example, a moving distance) of the electronic device based on sensing data which is provided by the sensing module 420. The location management module 402 may determine the effective range of the location information corresponding to the movement information of the electronic device. For example, the effective range of the location information corresponding to the movement information of the electronic device may include an effective range which is changed to correspond to the movement of the electronic device with reference to the effective range of the pre-stored location information. For example, if the effective range of the location information corresponding to the movement information of the electronic device falls within the effective range of the location information required by the application program, the location management module 402 may determine that the pre-stored location information is reliable. In addition, if the effective range of the location information corresponding to the movement information of the electronic device falls within the effective range of the location information required by the application program, and the measurement time of the pre-stored location information falls within the effective time range, the location management module 402 may determine that the pre-stored location information is reliable. In addition, if the effective range of the location information corresponding to the movement information of the electronic device exceeds the effective range of the location information required by the application program, the location management module 402 may determine that the pre-stored location information is not reliable.

The memory 410 may store instructions or data related to the elements constituting the electronic device.

According to an embodiment of the present disclosure, the memory 410 may store the location information (pre-stored location information) of the electronic device, including at least one of latitude, longitude, measurement time, effective range (accuracy), etc. For example, if the effective range of the pre-stored location information is 50 meters, the pre-stored location information may indicate that the electronic device is located within a 50-meter radius from a location which is determined by latitude and longitude. For example, the location information pre-stored in the memory 410 may represent at least one of location information which has been previously measured or determined by the electronic device or location information which is received from another electronic device (for example, a wearable device). The effective radius of the location information pre-stored in the memory 410 may be determined in a method of estimating a location or by a characteristic of a module.

The sensing module 420 may generate sensing data by converting measurement information on a physical quantity or sensing information on an operation state of the electronic device into electric signals. For example, the sensing module 420 may include a motion sensor, such an accelerometer, a gyroscope, a magnetic sensor, a barometer, etc., a microphone sensor for receiving a frequency of a non-audible band, an image sensor, an ultrasonic sensor, a visual light circuit (VLC), etc. For example, the sensing module 420 may further include a control circuit for controlling the at least one sensor included in the sensing module 420.

The location measurement module 430 may measure the location of the electronic device. For example, the location measurement module 430 may estimate the location of the electronic device using a GNSS such as GPS, GLONASS, BeiDou, Galileo, etc. For example, the location measurement module 430 may estimate the location of the electronic device using a network location system (NLS), such as a WiFi positioning system (WPS) which is based on triangulation, cell positioning, observed time difference of arrival (OTDOA), etc. For example, the location measurement module 430 may estimate the location of the electronic device based on a radio map or a list of access points (APs). For example, the location measurement module 430 may estimate the location of the electronic device using a short-distance wireless communication positioning method based on NFC, RF identification (RFID), Bluetooth low energy (BLE), etc.

According to an embodiment of the present disclosure, if the location management module 402 determines that the location information pre-stored in the memory 410 is not reliable or if no location information is pre-stored in the memory 410, the location measurement module 430 may measure the location of the electronic device. For example, the location measurement module 430 may determine whether location information matched with a network is reliable or not based on the effective range of the location information required by the application program. For example, the location measurement module 430 may first determine whether location information having a narrow effective range is reliable or not from among the pieces of location information matched with the network. For example, the location measurement module 430 may first determine whether location information having a wide effective range is reliable or not from among the pieces of location information matched with the network. For example, if the location information matched with the network is not determined to be reliable, the location measurement module 430 may measure the location of the electronic device using hardware resources such as a GNSS method.

The input module 440 may forward instructions or data for controlling an operation of the electronic device, which are inputted by the user or another external device, to other element(s) of the electronic device. For example, the input module 440 may include a key pad, a dome switch, a physical button, a touch pad (capacitive/resistive), a jog & shuttle, etc.

The display 450 may display diverse contents (for example, a text, an image, a video, an icon, a symbol, etc.) for the user.

According to an embodiment of the present disclosure, the effective range of the location information may be expressed by a real distance (for example, meters or kilometers) or a geographical context. For example, the geographical context may include an administrative district (towns/townships/neighborhoods (indicating subdivisions of a town), city, country, etc.), a display label on a map (for example, a distance label, a city label, a country label, etc.), location information of interest (for example, a subway station, a building, etc.).

Figure 5:
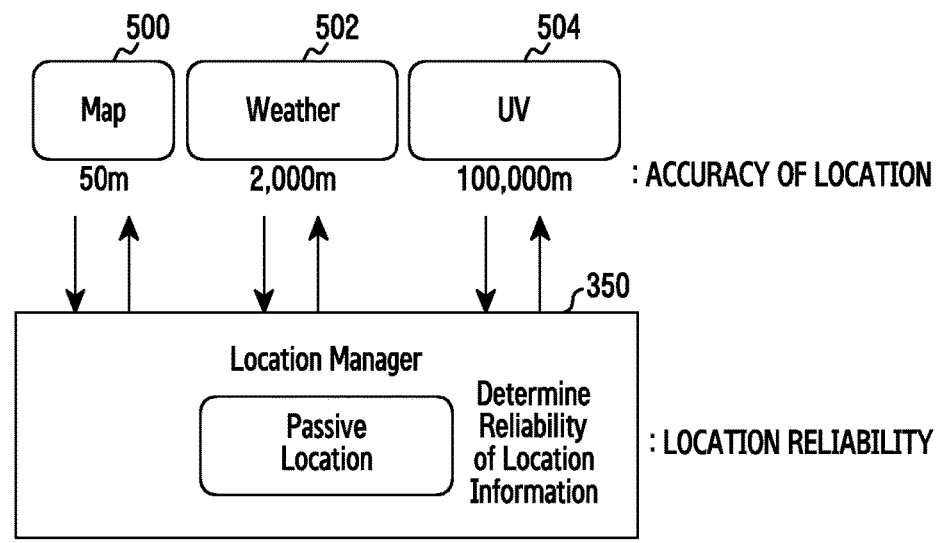
FIG. 5 illustrates a method of selectively measuring a location based on reliability of location information according to an embodiment of the present disclosure.
Figure 5:
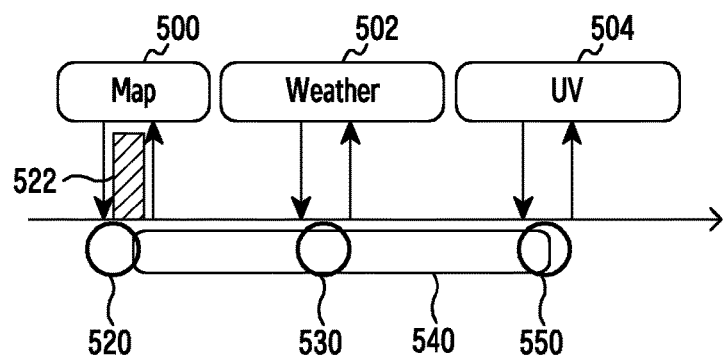

FIG. 5 illustrates a method of selectively measuring a location based on reliability of location information according to an embodiment of the present disclosure.

Referring to FIG. 5, if a map application 500 requires location information of an electronic device (for example, the electronic device 101 of FIG. 1), a location manager 350 (for example, the location management module 402 of FIG. 4) may determine at 520 whether location information pre-stored in a memory (for example, the memory 410 in FIG. 4) is reliable or not based on an effective range (for example, 50 meters) of the location information required by the map application 500.

According to an embodiment of the present disclosure, if the pre-stored location information is not determined to be reliable, the location manager 350 may measure the location 522 of the electronic device using the location measurement module 430. The map application 500 may display the location information of the electronic device on a map based on the location information 522 of the electronic device which is measured through the location measurement module 430. In this case, the location manager 350 may store the location information 522 of the electronic device which is measured using the location measurement module 430 in the memory 410 of FIG. 4.

According to an embodiment of the present disclosure, if a weather application 502 requires the location information of the electronic device, the location manager 350 may determine at 530 whether the pre-stored location information 522 is reliable or not based on an effective range (for example, 2,000 meters) of location information required by the weather application 502.

According to an embodiment of the present disclosure, if the pre-stored location information is determined to be reliable, the location manager 350 may provide the pre-stored location information to the weather application 502. The weather application 502 may provide a weather service based on the pre-stored location information. In this case, the location manager 350 may maintain at 540 the location information measured using the location measurement module 430.

According to an embodiment of the present disclosure, if an ultraviolet (UV) application 504 requires the location information of the electronic device, the location manager 350 may determine at 550 whether the pre-stored location information 522 is reliable or not based on an effective range (for example, 100,000 meters) of location information required by the UV application 504.

According to an embodiment of the present disclosure, if the pre-stored location information is determined to be reliable, the location manager 350 may provide the pre-stored location information to the UV application 504. The UV application 504 may provide UV information based on the pre-stored location information. In this case, the location manager 350 may maintain at 540 the location information measured using the location measurement module 430.

In FIG. 5, if the pre-stored location information is reliable, the electronic device provides the pre-stored location information to an application program which requires the location information of the electronic device, so that the number of times of the location is measured may be reduced.

According to an embodiment of the present disclosure, an electronic device may include a location measurement module to measure a location; a memory to store an application program; and a processor electrically connected to the location measurement module and the memory. The memory may store instructions to control the processor, when being executed, to store location information obtained by the location measurement module in the memory, process a request from the application program to obtain location information after storing the location information in the memory, and, in response to the request for location information, provide the stored location information to the application program based on at least part of the location information stored in the memory.

According to an embodiment of the present disclosure, the instructions may be to control the processor to determine whether to provide the stored location information to the application program or not based on information related to the application program and the stored location information.

According to an embodiment of the present disclosure, the information related to the application program may include information related to at least one of a location, an address, a distance, a time, a kind, a type, or a category.

According to an embodiment of the present disclosure, the instructions may be to control the processor to determine whether to provide the stored location information to the application program or not based on at least one of a state or a context of the electronic device.

According to an embodiment of the present disclosure, the context may include at least one of a location, a moving distance, a moving direction, or a location measuring period of the electronic device.

According to an embodiment of the present disclosure, an electronic device may include a location measurement module to measure a location; a memory to store a first application program and a second application program; and a processor electrically connected to the location measurement module and the memory. The memory may store instructions to control the processor, when being executed, to process a first request from the first application program for location information, obtain location information using the location measurement module in response to the first request for location information, store the location information obtained by the location measurement module in the memory, process a second request from the second application program for location information after storing the location information in the memory, and, in response to the second request for location information, provide the stored location information to the second application program based on at least part of the stored location information.

According to an embodiment of the present disclosure, the instructions may be to control the processor to determine whether to provide the stored location information to the second application program or not based on information related to the second application program and the location information stored in the memory.

According to an embodiment of the present disclosure, the information related to the second application program may include information related to at least one of a location, an address, a distance, a time, a kind, a type, or a category.

According to an embodiment of the present disclosure, the instructions may be to control the processor to determine whether to provide the location information stored in the memory to the second application program or not based on at least one of a state or a context of the electronic device.

According to an embodiment of the present disclosure, the instructions may be to provide the location information stored in the memory to the second application program in response to a determination that the stored location information is provided to the second application program.

According to an embodiment of the present disclosure, the instructions may be to obtain location information of the electronic device using the location measurement module in response to a determination that the stored location information is not provided to the second application program, and to provide the location information obtained by the location measurement module to the second application program.

According to an embodiment of the present disclosure, the location measurement module may determine reliability of location information matched with a network based on an effective range of location information corresponding to an application program, and, if the location information matched with the network is determined to be reliable, the location measurement module may determine the location information matched with the network as the location of the electronic device.

According to an embodiment of the present disclosure, if the location information matched with the network is not determined to be reliable, the location measurement module may measure the location of the electronic device using hardware resources.

According to an embodiment of the present disclosure, the hardware resources may include a location measurement module of a GNSS method.

Figure 6:
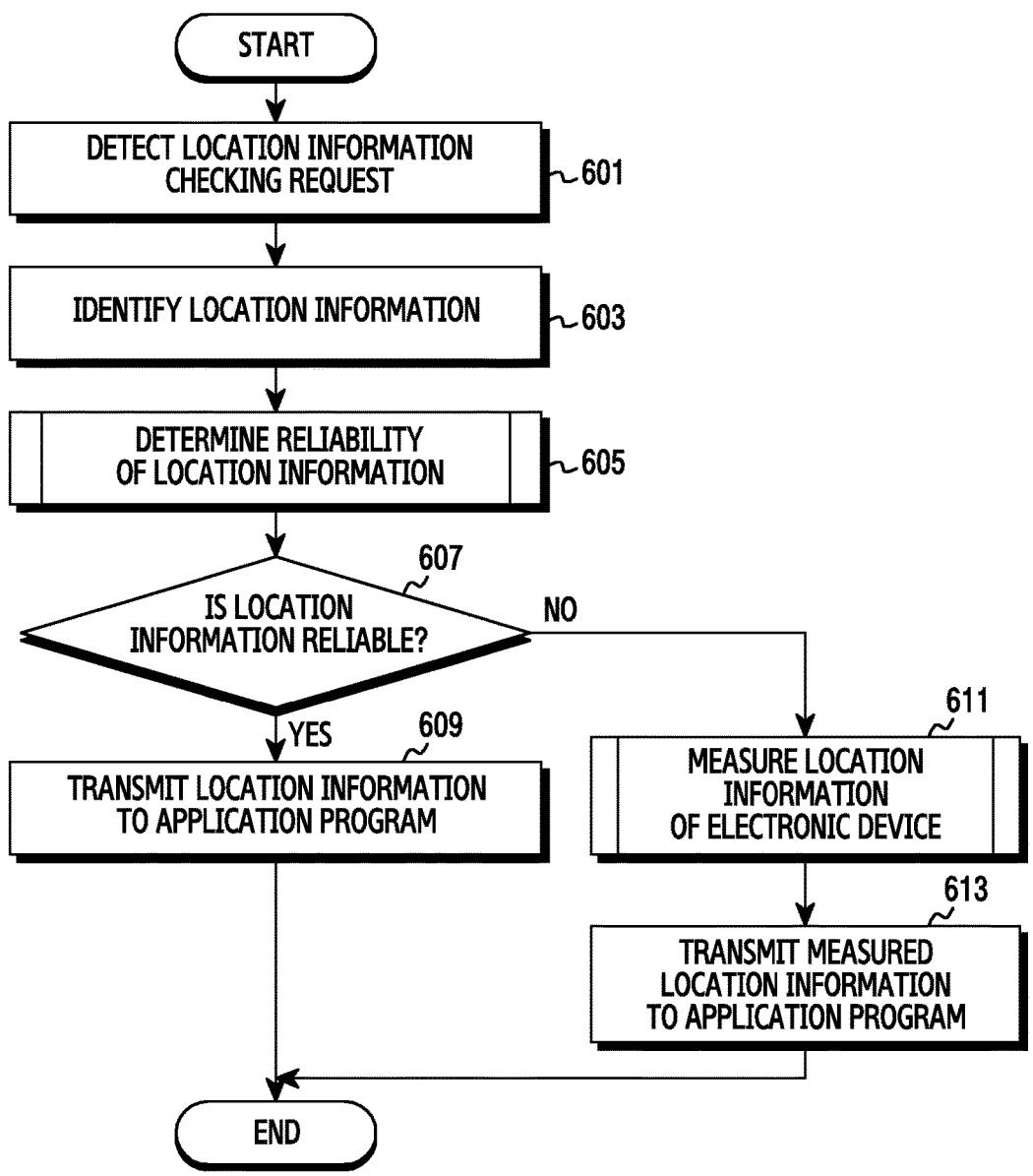
FIG. 6 is a flowchart of a method of selectively measuring a location based on reliability of location information according to an embodiment of the present disclosure.

FIG. 6 is a flowchart of a method of selectively measuring a location based on reliability of location information according to an embodiment of the present disclosure.

Referring to FIG. 6, in operation 601, the electronic device (for example, the electronic device 101 of FIG. 1) may detect a request to check location information. For example, the controller 400 (for example, the processor 120 of FIG. 1) may determine whether a corresponding application program requires location information of the electronic device 101 or not based on input from the application program.

In operation 603, the electronic device may identify location information pre-stored in the electronic device. For example, the controller 400 may identify the location information pre-stored in the memory 410. For example, the controller 400 may determine whether location information is pre-stored in a location database (DB) of the memory 410 or not. If no location information is pre-stored in the location DB, the controller 400 may measure the location of the electronic device 101 using the location measurement module 430.

In operation 605, the electronic device may determine reliability of the pre-stored location information. For example, the controller 400 may determine the reliability of the pre-stored location information based on information regarding an application program which requires the location of the electronic device and the location information pre-stored in the memory 410. For example, the information regarding the application program may include information related to at least one of a location, an address, a distance, a time, a kind, a type, or a category. The at least one of the location, the address, the distance, the kind, the type, or the category included in the information regarding the application program may be used to determine an effective range of location information which is required by the application program. The time included in the information regarding the application program may be used to determine an effective time range for determining the reliability of the pre-stored location information. Additionally, the controller 400 may determine the reliability of the pre-stored location information based on at least one of a state or a context of the electronic device. The state and the context of the electronic device may be used to estimate a moving distance of the electronic device. The context of the electronic device may include at least one of a location, a moving distance, a moving direction, or a location measuring period of the electronic device.

In operation 607, the electronic device may determine whether the pre-stored location information is reliable or not. For example, the controller 400 may determine whether the pre-stored location information is reliable or not based on the determination of whether or not the pre-stored information is reliable or not in operation 605.

If the pre-stored location information is reliable, the electronic device may transmit the pre-stored location information to the application program which requires the location information of the electronic device in operation 609.

If the pre-stored location information is not reliable, the electronic device may measure the location of the electronic device using the location measurement module 430 in operation 611.

In operation 613, the electronic device may transmit the location information of the electronic device which is measured using the location measurement module 430 to the application program which requires the location information of the electronic device. In this case, the electronic device may store the location information of the electronic device which is transmitted to the application program in the memory 410.

Figure 7:
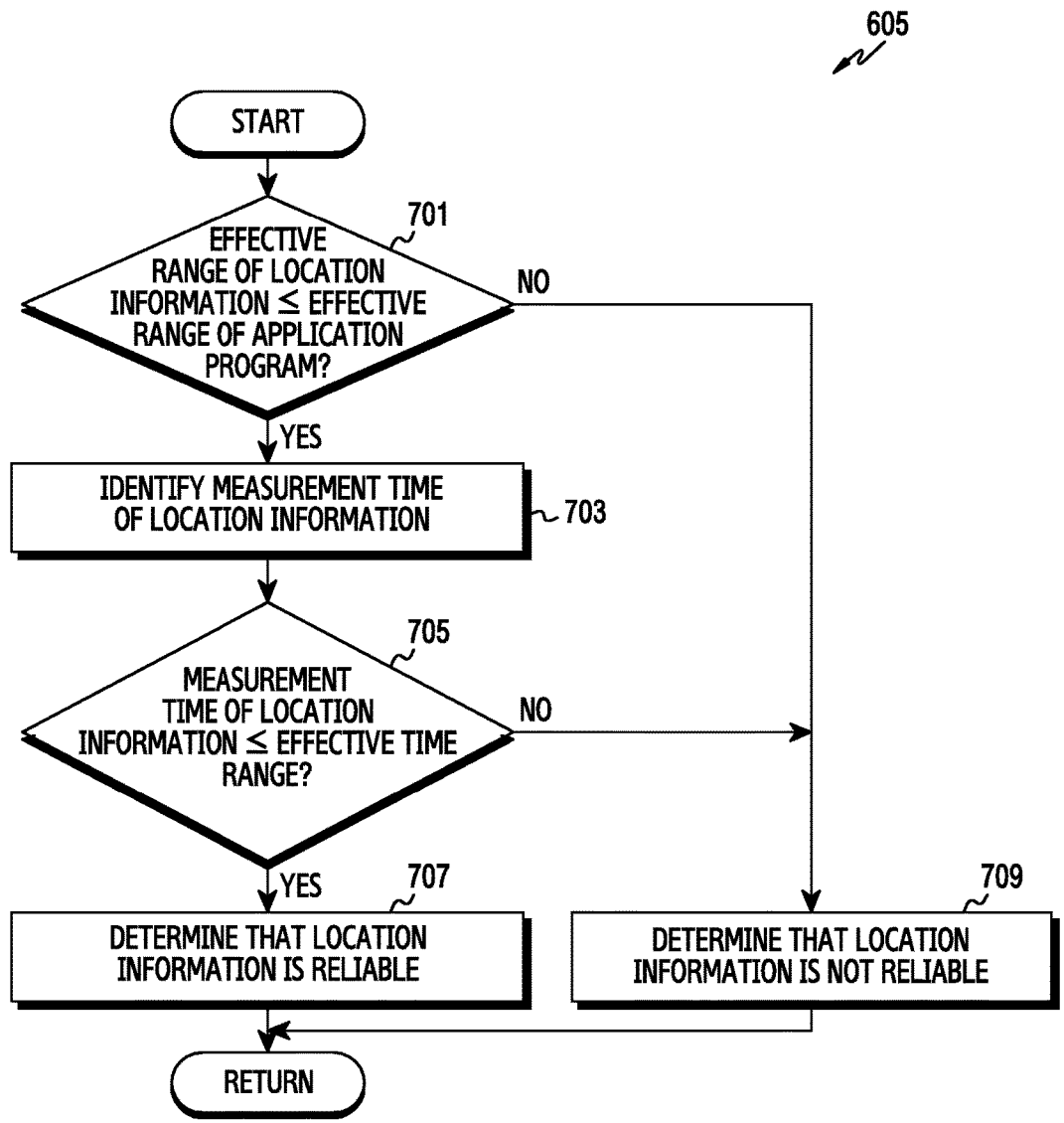
FIG. 7 is a flowchart of a method of determining reliability of location information based on an effective range of location information and a measurement time in an electronic device according to an embodiment of the present disclosure.

FIG. 7 is a flowchart of a method of determining reliability of location information based on an effective range of location information and a measurement time in the electronic device according to an embodiment of the present disclosure. The operation 605 in FIG. 6 of determining the reliability of location information pre-stored in the memory is described below in more detail.

Referring to FIG. 7, in operation 701, the electronic device (for example, the electronic device 101 of FIG. 1) may determine whether or not an effective range of location information pre-stored in the electronic device falls within an effective range of location information required by an application program. For example, the controller 400 may identify the effective range of the location information required by the application program. For example, the controller 400 may determine the effective range of the location information required by the application program based on a characteristic of the application program (for example, the kind of and/or function of the application program) requiring the location information. For example, if the application program requiring the location information is related to commerce, the controller 400 may determine the effective rage of the location information to be relatively narrow. For example, if the application program requiring the location information is related to an environment (for example, weather, atmospheric pressure, altitude, UV light, etc.), the controller 400 may determine the effective range of the location information to be relatively wide.

In operation 703, if the effective range of the pre-stored location information falls within the effective range of the location information required by the application program, the electronic device may identify a measurement time of the pre-stored location information. For example, the controller 400 may detect the measurement time of the pre-stored location which is included in a location DB.

In operation 705, the electronic device may determine whether the measurement time of the pre-stored location information falls within an effective time range or not. For example, the effective time range may be determined by the application program requiring the location information. For example, the controller 400 may determine the effective time range based on a characteristic of the application program requiring the location information.

In operation 707, if the measurement time of the pre-stored location information falls within the effective time range, the electronic device may determine that the pre-stored location information is reliable. For example, if the measurement time of the pre-stored location information falls within the effective time range, the controller 400 may determine that the electronic device 100 has been located within the effective range of the pre-stored location information from the time if the pre-stored location information was measured. Accordingly, the controller 400 may determine that the pre-stored location information is reliable.

In operation 709, if the effective range of the pre-stored location information exceeds the effective range of the location information required by the application program, or if the measurement time of the pre-stored location information falls outside of the effective time range, the electronic device may determine that the pre-stored location information is not reliable.

Figure 8:
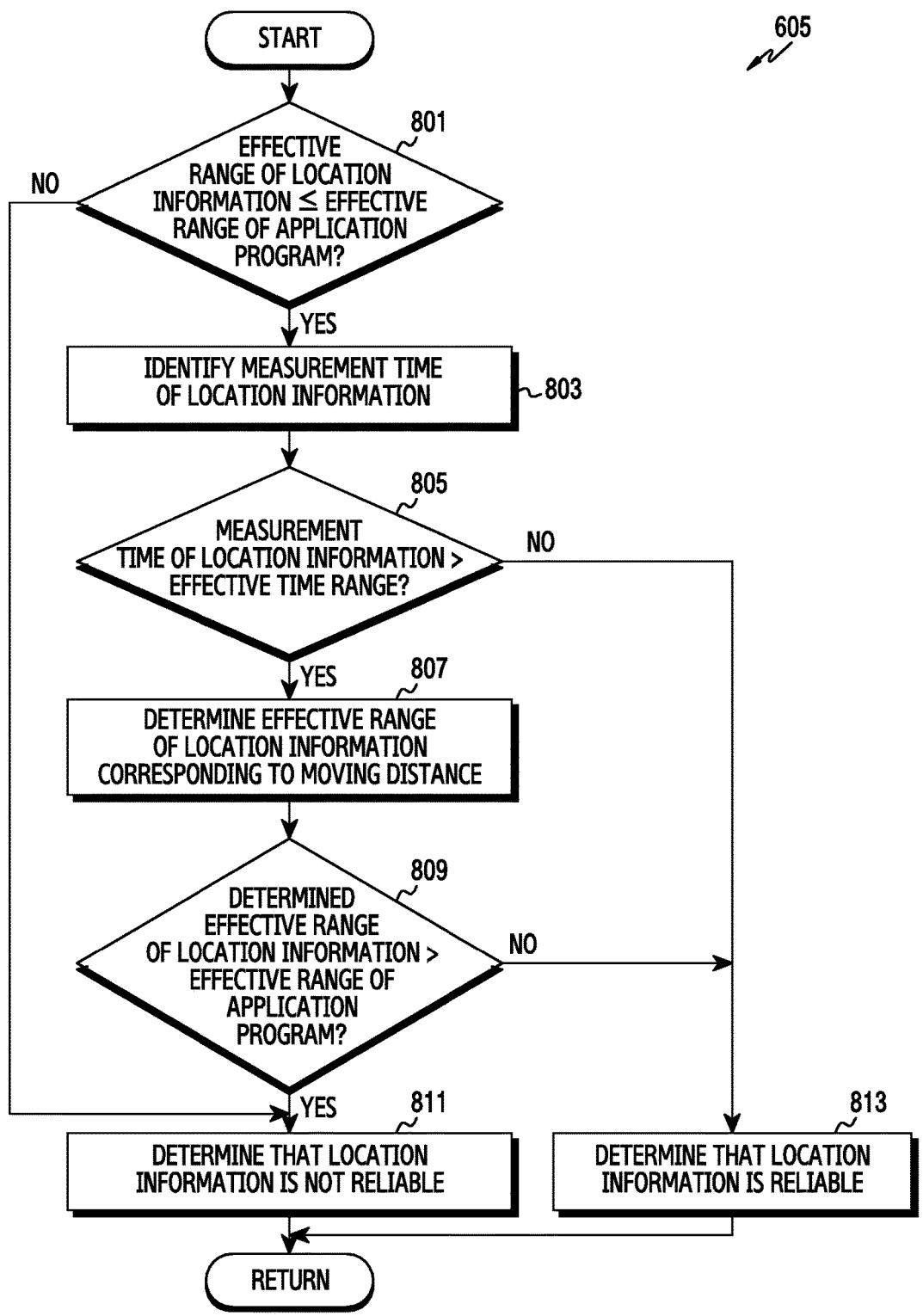
FIG. 8 is a flowchart of a method of determining reliability of location information based on an effective range of location information, a measurement time, and movement information in an electronic device according to an embodiment of the present disclosure.

FIG. 8 is a flowchart of a method of determining reliability of location information based on an effective range of location information, a measurement time, and movement information in an electronic device according to an embodiment of the present disclosure. The operation 605 in FIG. 6 of determining the reliability of pre-stored location information is described below in more detail.

Referring to FIG. 8, in operation 801, the electronic device (for example, the electronic device 101 of FIG. 1) may determine whether or not an effective range of location information pre-stored in the electronic device falls within an effective range of location information required by an application program.

In operation 803, if the effective range of the pre-stored location information falls within the effective range of the location information required by the application program, the electronic device may identify a measurement time of the pre-stored location information.

In operation 805, the electronic device may determine whether the measurement time of the pre-stored location information falls outside of an effective time range or not.

In operation 807, if the measurement time of the pre-stored location information falls outside of the effective time range, the electronic device may determine an effective range of location information corresponding to a moving distance of the electronic device. For example, the controller 400 may determine what kind of movement is sensed by the electronic device (for example, stopping, walking, running, riding a bicycle, riding in a vehicle, etc.) based on sensing data which is detected through the sensing module 430. The controller 400 may estimate a moving distance of the electronic device 101 based on a reference moving speed matched with the kind of movement and an elapsed time from the measurement time of the pre-stored location information. The controller 400 may change the effective range of the location information to correspond to the moving distance of the electronic device 101 based on the effective range of the pre-stored location information.

In operation 809, the electronic device may determine whether or not the effective range of the location information corresponding to the moving distance of the electronic device exceeds the effective range of the location information required by the application program.

In operation 811, if either the effective range of the location information or the effective range of the location information corresponding to the moving distance of the electronic device exceeds the effective range of the location information required by the application program, the electronic device may determine that the pre-stored location information is not reliable.

In operation 813, if the measurement time of the pre-stored location information falls within the effective time range, or if the effective range of the location information corresponding to the moving distance of the electronic device falls within the effective range of the location information required by the application program, the electronic device may determine that the pre-stored location information is reliable.

Figure 9:
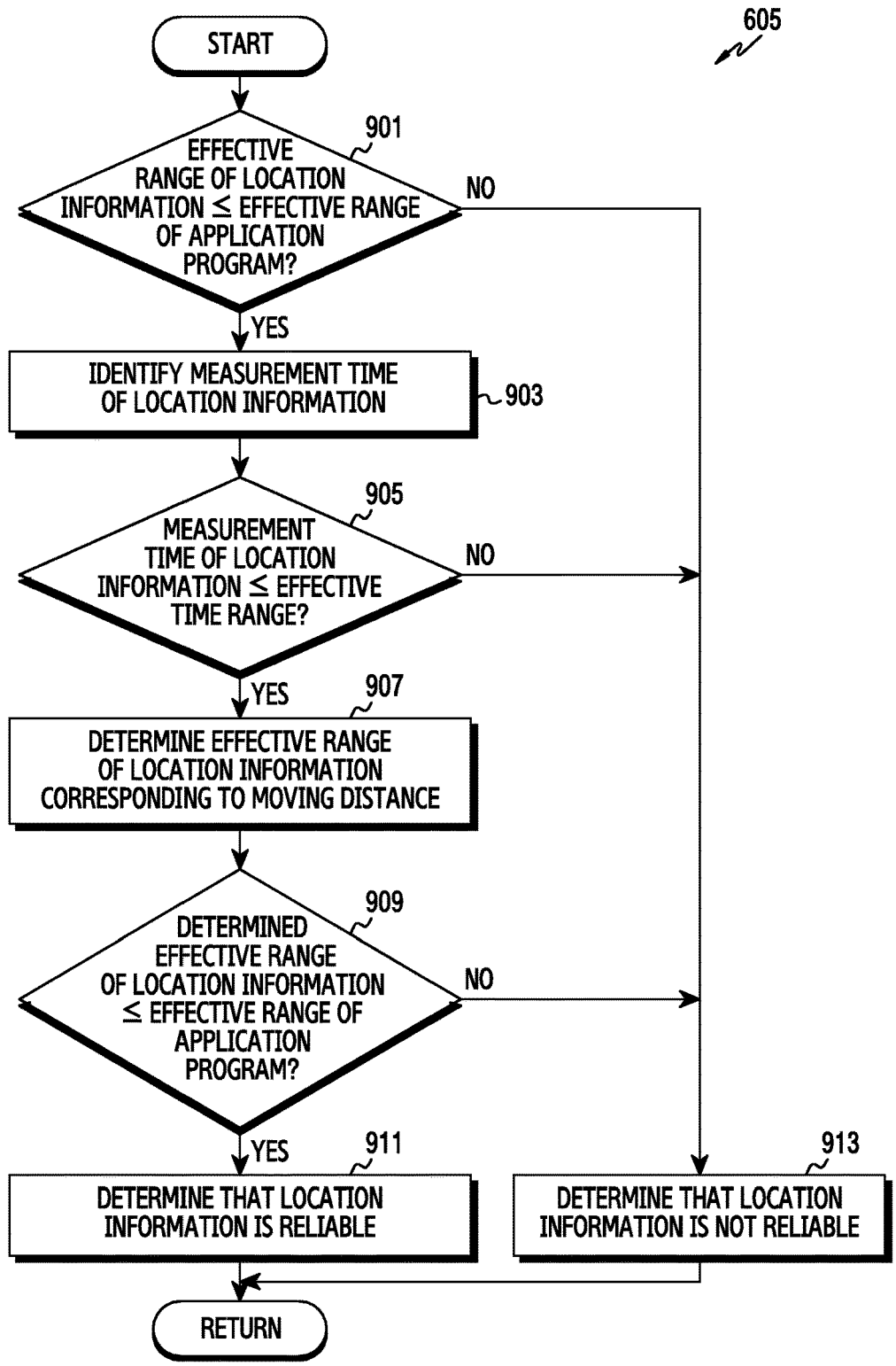
FIG. 9 is a flowchart of a method of determining reliability of location information based on an effective range of location information, a measurement time, and movement information according to an embodiment of the present disclosure.

FIG. 9 is a flowchart of a method of determining reliability of location information based on an effective range of location information, a measurement time, and movement information in an electronic device according to an embodiment of the present disclosure. The operation 605 in FIG. 6 of determining the reliability of pre-stored location information is described below in more detail.

Referring to FIG. 9, in operation 901, the electronic device (for example, the electronic device 101 of FIG. 1) may determine whether or not an effective range of location information pre-stored in the electronic device falls within an effective range of location information required by an application program.

In operation 903, if the effective range of the pre-stored location information falls within the effective range of the location information required by the application program, the electronic device may identify a measurement time of the pre-stored location information.

In operation 905, the electronic device may determine whether the measurement time of the pre-stored location information falls within an effective time range or not.

In operation 907, if the measurement time of the pre-stored location information falls within the effective time range, the electronic device may determine an effective range of location information corresponding to a moving distance of the electronic device. For example, the controller 400 may estimate the moving distance of the electronic device based on sensing data provided from the sensing module 420 and the measurement time of the pre-stored location information. The controller 400 may change the effective range of the pre-stored location information to correspond to the moving distance of the electronic device 101.

In operation 909, the electronic device may determine whether or not the effective range of the location information corresponding to the moving distance of the electronic device falls within the effective range of the location information required by the application program.

In operation 911, if the effective range of the location information corresponding to the moving distance of the electronic device falls within the effective range of the location information required by the application program, the electronic device may determine that the pre-stored location information is reliable.

In operation 913, if the effective range of the location information exceeds the effective range of the location information required by the application program, if the measurement time of the pre-stored location information falls outside of the effective time range, or if the effective range of the location information corresponding to the moving distance of the electronic device exceeds the effective range of the location information required by the application program, the electronic device may determine that the pre-stored location information is not reliable.

Figure 10A:
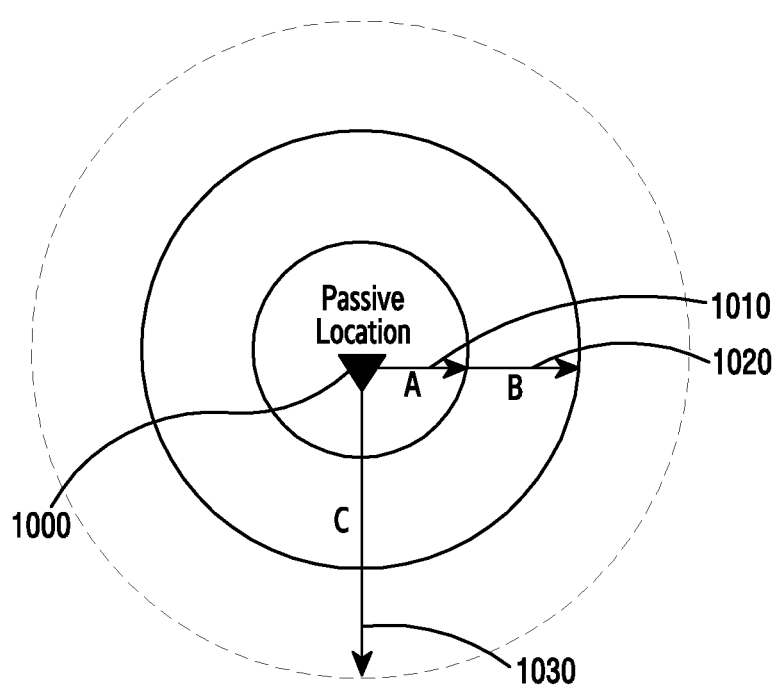
FIGS. 10A and 10B illustrate an effective range of location information according to embodiments of the present disclosure.
Figure 10B:
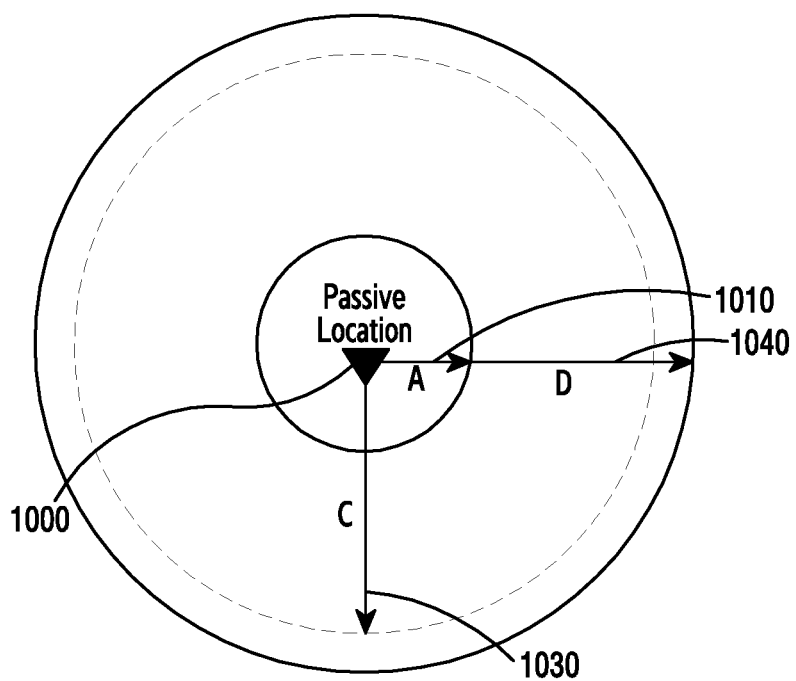

FIGS. 10A and 10B illustrate an effective range of location information according to an embodiment of the present disclosure.

Referring to FIGS. 10A and 10B, location information pre-stored in an electronic device may include a point 1000 identified by a triangle and an effective range A 1010.

According to an embodiment of the present disclosure, with reference to FIG. 10A, the controller 400 may change the effective range of the pre-stored location information to correspond to a moving distance B 1020 of the electronic device from the time the pre-stored location information was measured. For example, the controller 400 may estimate the moving distance of the electronic device 101 based on a reference moving speed matched with the kind of movement of the electronic device 101 (for example, stopping, walking, running, riding a bicycle, riding in a vehicle, etc.), and an elapsed time from the measurement time of the pre-stored location information. The controller 400 may change the effective range A 1010 of the pre-stored location information to correspond to the moving distance of the electronic device 101 (e.g. A+B). For example, if the electronic device 101 is moved by walking for 30 minutes, the controller 400 may estimate that the electronic device is moved by 500 meters based on a reference speed (for example, 3 km/h) corresponding to walking, and an elapsed time (e.g. 10 minutes). If the effective range of the pre-stored location information is 100 meters, the controller 400 may change the effective range of the location information to 600 meters to correspond to the moving distance of the electronic device.

According to an embodiment of the present disclosure, if the effective range (e.g. A+B) of the location information corresponding to the moving distance of the electronic device falls within an effective range C 1030 of location information required by the application program, the controller 400 may determine that the pre-stored location information is reliable. For example, if the weather application 502 of FIG. 5 requires the location information of the electronic device, and the effective range (for example, 600 meters) of the location information corresponding to the moving distance of the electronic device falls within the effective range (for example, 2000 meters) of the location information required by the weather application program, the controller 400 may determine that the pre-stored location information is reliable.

According to an embodiment of the present disclosure, with reference to FIG. 10B, the controller 400 may change the effective range of the pre-stored location information to correspond to a moving distance D 1040 of the electronic device from the time the pre-stored location information was measured. For example, the controller 400 may change the effective range A 1010 of the pre-stored location information to correspond to the moving distance of the electronic device 101 (e.g. A+D). For example, if the electronic device 101 is moved by a vehicle for 3 minutes, the controller 400 may estimate that the electronic device is moved by 3000 meters based on a reference speed (for example, 60 km/h) corresponding to the vehicle and an elapsed time (e.g. 3 minutes). If the effective range of the pre-stored location information is 100 meters, the controller 400 may change the effective range of the location information to 3100 meters to correspond to the moving distance of the electronic device.

According to an embodiment of the present disclosure, if the effective range (e.g. A+D) of the location information corresponding to the moving distance of the electronic device exceeds the effective range C 1030 of the location information required by the application program, the controller 400 may determine that the pre-stored location information is not reliable. For example, if the weather application 502 of FIG. 5 requires the location information of the electronic device, and the effective range (for example, 3100 meters) of the location information corresponding to the moving distance of the electronic device exceeds the effective range (for example, 2000 meters) of the location information required by the weather application program, the controller 400 may determine that the pre-stored location information is not reliable.

Figure 11:
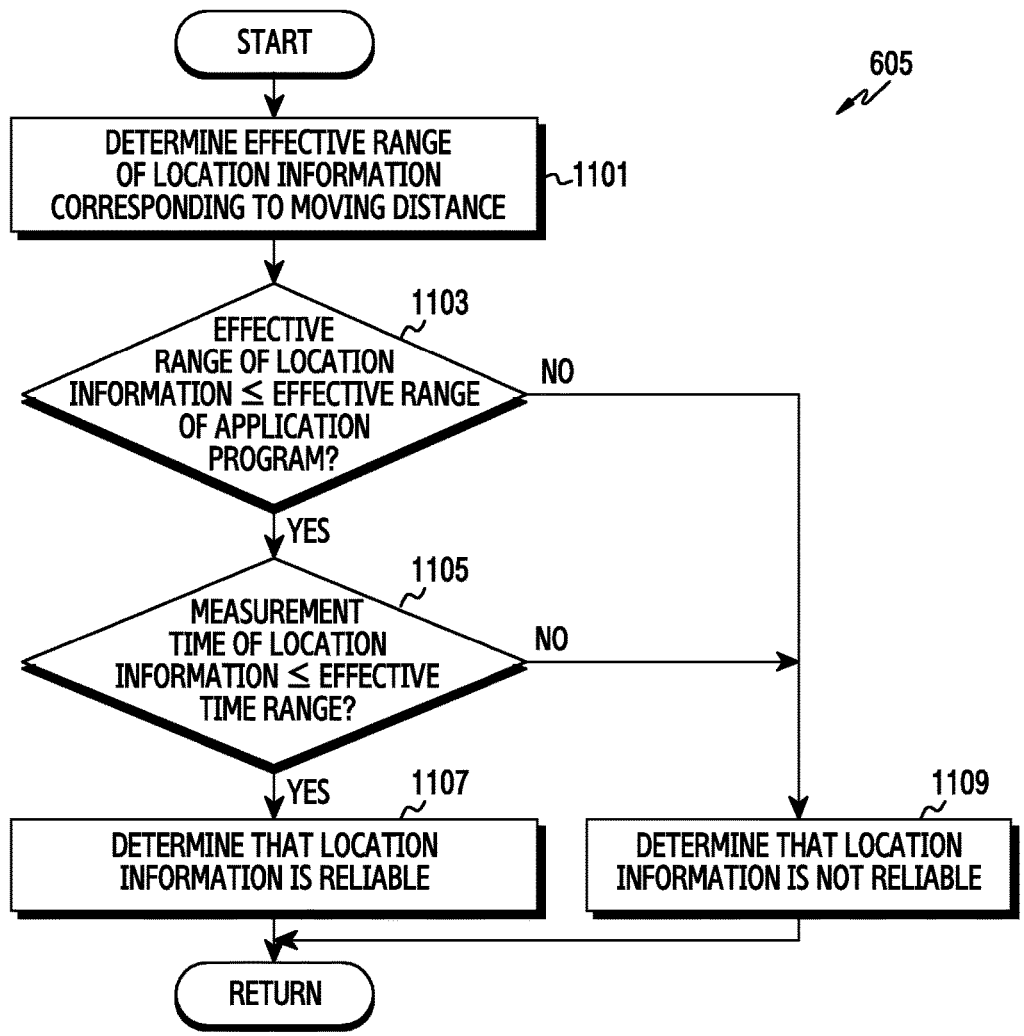
FIG. 11 is a flowchart of a method of determining reliability of location information based on a changed effective range of location information and a measurement time in an electronic device according to an embodiment of the present disclosure.

FIG. 11 is a flowchart of a method of determining reliability of location information based on a changed effective range of location information and a measurement time in an electronic device according to an embodiment of the present disclosure. The operation 605 of FIG. 6 of determining the reliability of pre-stored location information is described below in more detail.

Referring to FIG. 11, in operation 1101, the electronic device (for example, the electronic device 101 of FIG. 1) may determine an effective range of location information corresponding to a moving distance of the electronic device. For example, the controller 400 may estimate the moving distance of the electronic device 101 based on an elapsed time from the measurement of the pre-stored location information and the kind of movement of the electronic device 101, which is determined based on a movement pattern of sensing data of the sensing module 420. The controller 400 may change the effective range of the pre-stored location information to correspond to the moving distance of the electronic device 101.

In operation 1103, the electronic device may determine whether or not the effective range of the location information corresponding to the moving distance of the electronic device falls within an effective range of location information required by an application program.

In operation 1105, if the effective range of the location information corresponding to the moving distance of the electronic device falls within the effective range of the location information required by the application program, the electronic device may determine whether the measurement time of the pre-stored location information falls within an effective time range or not.

In operation 1107, if the measurement time of the pre-stored location information falls within the effective time range, the electronic device may determine that the pre-stored location information is reliable.

In operation 1109, if the effective range of the location information corresponding to the moving distance of the electronic device exceeds the effective range of the location information required by the application program, or if the measurement time of the pre-stored location information exceeds the effective time range, the electronic device may determine that the pre-stored location information is not reliable.

Figure 12:
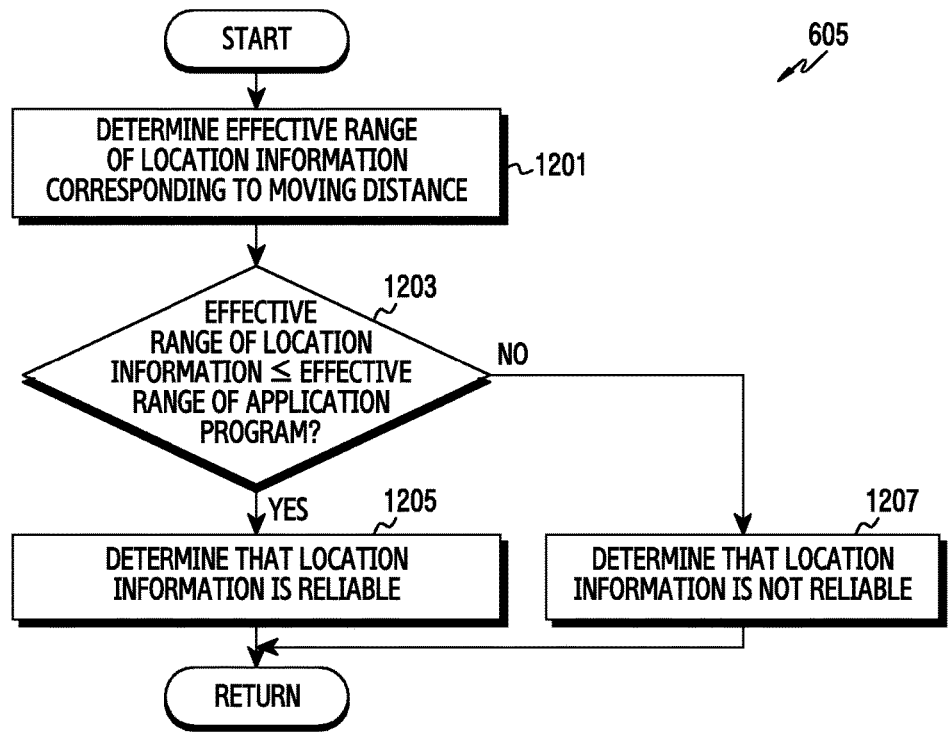
FIG. 12 is a flowchart of a method of determining reliability of location information based on a changed effective range of location information in an electronic device according to an embodiment of the present disclosure.

FIG. 12 is a flowchart of a method of determining reliability of location information based on a changed effective range of location information in the electronic device according to an embodiment of the present disclosure. The operation 605 in FIG. 6 of determining the reliability of pre-stored location information is explained below in more detail.

Referring to FIG. 12, in operation 1201, the electronic device (for example, the electronic device 101 of FIG. 1) may determine an effective range of location information corresponding to a moving distance of the electronic device. For example, the moving distance of the electronic device 101 may be determined based on the kind of movement of the electronic device 101, which is determined based on sensing data of the sensing module 420 of the electronic device 101, and an elapsed time from the measurement of the pre-stored location information.

In operation 1203, the electronic device may determine whether or not the effective range of the location information corresponding to the moving distance of the electronic device falls within an effective range of location information required by an application program.

In operation 1205, if the effective range of the location information corresponding to the moving distance of the electronic device falls within the effective range of the location information required by the application program, the electronic device may determine that the pre-stored location information is reliable.

In operation 1207, if the effective range of the location information corresponding to the moving distance of the electronic device exceeds the effective range of the location information required by the application program, the electronic device may determine that the pre-stored location information is not reliable.

Figure 13:
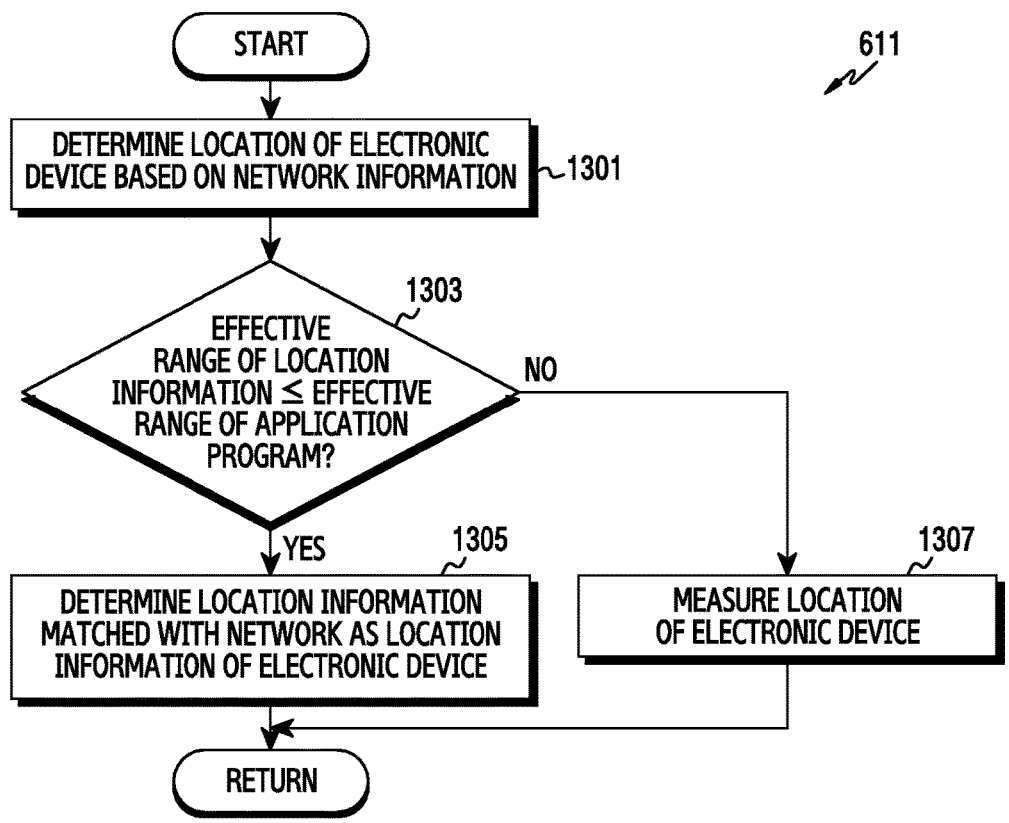
FIG. 13 is a flowchart of a method of measuring a location in an electronic device according to an embodiment of the present disclosure.

FIG. 13 is a flowchart of a method of measuring a location in an electronic device according to an embodiment of the present disclosure. The operation 611 in FIG. 6 of measuring the location of the electronic device is described below in more detail.

Referring to FIG. 13, in operation 1301, the electronic device (for example, the electronic device 101 of FIG. 1) may identify location information matched with a searchable network. For example, the processor 120 of the electronic device 101 may discover an access point (AP) using the communication interface 170. The processor 120 may identify the location information matched with the discovered AP.

In operation 1303, the electronic device may determine whether or not an effective range of the location information matched with the network falls within an effective range of location information required by an application program.

In operation 1305, if the effective range of the location information matched with the network falls within the effective range of the location information required by the application program, the electronic device may determine the location information matched with the network as location information of the electronic device.

In operation 1307, if the effective range of the location information matched with the network exceeds the effective range of the location information required by the application program, the electronic device may measure the location of the electronic device using hardware resources (for example, a GNSS). Additionally, if there is no location information matched with the network, the electronic device may measure the location of the electronic device 101 using hardware resources (for example, a location measurement module adopting a GNSS method).

According to the embodiment of the present disclosure illustrated in FIG. 13, if the effective range of the location information matched with the network exceeds the effective range of the location information required by the application program, the electronic device may measure the location of the electronic device using the hardware resources.

According to an embodiment of the present disclosure, if the effective range of the location information matched with the network exceeds the effective range of the location information required by the application program, the electronic device may determine the reliability of an effective range of location information matched with a different kind of network.

According to an embodiment of the present disclosure, the electronic device may determine the reliability of an effective range in ascending order of size, that is, from location information of a network having a narrow effective range to location information of a network having a wide effective range. For example, the electronic device may determine the reliability of location information matched with a network of a short-distance communication method such as a wireless local area network (LAN)/Bluetooth. If the location information matched with the network of the short-distance communication method is not reliable, the electronic device may determine the reliability of location information (for example, towns/townships/neighborhoods (indicating subdivisions of a town)) matched with a cell (e.g. cell ID). If the location information matched with the cell is not reliable, the electronic device may determine the reliability of location information (for example, a city) matched with a location area identity (LAI). If the location information matched with the LAI is not reliable, the electronic device may determine the reliability of location information (for example, a country) matched with a mobile network code (MCC).

According to an embodiment of the present disclosure, the electronic device may determine the reliability in descending order of size of an effective range, that is, from location information of a network having a wide effective range to location information of a network having a narrow effective range.

The operations described in the methods illustrated in FIGS. 6 to 9 and FIGS. 11 to 13 may be performed in sequence, in parallel, repeatedly, or heuristically. In addition, the operations may be performed in a different order, and an operation may be omitted or another operation may be added.

According to an embodiment of the present disclosure, if a location use setting is deactivated (e.g. is turned OFF), and an application program driven periodically requires location information, an electronic device may activate the location use setting to obtain location information. For example, if a weather application requires a current location of the electronic device to measure weather every hour, the electronic device may activate (e.g. turn ON) the location use setting which is in the deactivated state at the time if the location measurement is required (for example, every hour), and obtain the location information of the electronic device. In this case, the electronic device may obtain the location information of the electronic device based on location information matched with a network. In addition, if the location information pre-stored in the electronic device is determined to be reliable, the electronic device may not activate the location use setting and may provide the pre-stored location information to the weather application.

Figure 14:
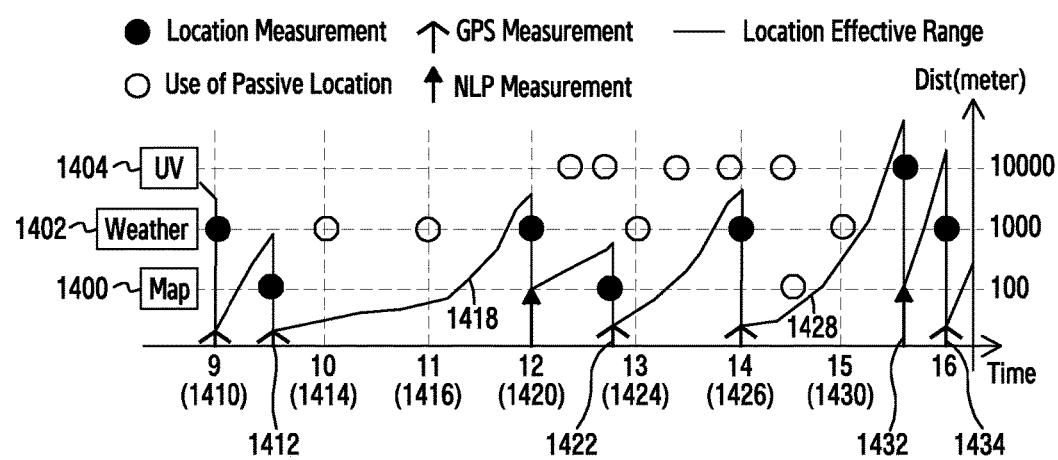
FIG. 14 is a graph of location information obtained in an electronic device at different times according to an embodiment of the present disclosure.

FIG. 14 is a graph of location information obtained in an electronic device at different times according to an embodiment of the present disclosure.

Referring to FIG. 14, a map application 1400 may include an effective range (e.g. location reliability) of 100 meters, a weather application 1402 may include an effective range of 1000 meters, and an application 1404 displaying an ultraviolet (UV) light index (e.g. UV value) may include an effective range of 10000 meters.

According to an embodiment of the present disclosure, if there is no pre-stored information in the electronic device at 9 o'clock 1410, the electronic device may measure the location of the electronic device in response to a location request of the weather application 1402. For example, if a GPS is set as a location measuring means, the electronic device may measure the location of the electronic device using a GPS module. For example, the location information of the electronic device which is measured using the GPS module may have an effective range (e.g. accuracy) of about 10 meters.

According to an embodiment of the present disclosure, the electronic device may determine the effective range of the location information to be about 1000 meters based on movement of the electronic device made from 9:00 AM 1410 to 9:30 AM 1412. If the map application 1400 is executed at 9:30 AM 1412, the electronic device may determine that the pre-stored location information is not reliable based on the effective range of the location information corresponding to the moving distance of the electronic device. That is, since the effective range (about 1000 meters) of the location information corresponding to the moving distance of the electronic device exceeds the effective range (e.g. 100 meters) of the map application, the electronic device may determine that the pre-stored location information is not reliable. Accordingly, the electronic device may measure the location of the electronic device using the GPS module.

According to an embodiment of the present disclosure, if the electronic device stays within an indoor space starting at 9:30 AM 1412, the effective range of the pre-stored location information may be constantly maintained or may slowly increase with time. In response to a location request of the weather application 1402 between 10:00 AM 1414 and 11:00 AM 1416, the electronic device may provide the pre-set location information to the weather application 1402. That is, since the effective range of the location information corresponding to the moving distance of the electronic device falls within the effective range (e.g. 1000 meters) of the weather application 1402, the electronic device may determine that the pre-stored location information is reliable. Accordingly, the electronic device may provide the pre-set location information to the weather application 1402.

According to an embodiment of the present disclosure, the electronic device may start moving because of a walk 1418 in order to have lunch at 11:30 AM. Since the effective range of the location information exceeds the effective range (e.g. 1000 meters) of the weather application 1402 at 12:00 PM 1420, the electronic device may measure the location of the electronic device in response to a location request of the weather application 1402. For example, if the location measurement using the GPS module installed within an indoor space is restricted, the electronic device may measure the location of the electronic device using an NLP method such as a wireless LAN (WiFi). For example, the location information of the electronic device measured using the NLP method may have an effective range of about 100 meters.

According to an embodiment of the present disclosure, the effective range of the location information corresponding to a moving distance of an electronic device may continuously increase from 12:00 PM 1420 to 12:45 PM 1422 due to movement of the electronic device caused by a user walking in an outdoor space after lunch. If the health application 1404 for UV measurement is executed at 12:45 PM 1422, the electronic device may provide the pre-set location information to the health application 1404 in response to a location request of the health application 1404. That is, since the effective range of the location information corresponding to the moving distance of the electronic device falls within the effective range (e.g. 10000 meters) of the health application 1404, the electronic device may determine that the pre-stored location information is reliable. Accordingly, the electronic device may provide the pre-set location information to the health application 1404.

According to an embodiment of the present disclosure, if the map application 1400 is executed at 12:45 PM 1422, the electronic device may measure the location of the electronic device, since the effective range of the location information at 12:45 PM 1422 exceeds the effective range (e.g. 100 meters) of the map application 1400.

According to an embodiment of the present disclosure, the effective range of the location information corresponding to the moving distance of the electronic device may continuously increase from 12:45 PM 1422 to 2:00 PM (or 1400 military time) 1426 due to the movement of the electronic device made by the user walking. Since the effective range of the location information corresponding to the moving distance of the electronic device at 1:00 PM (or 1300 military time) 1424 falls within the effective range (e.g. 1000 meters) of the weather application 1402, the electronic device may provide the pre-set location information to the weather application 1402. Since the effective range of the location information corresponding to the moving distance of the electronic device at 2:00 PM 1426 exceeds the effective range (e.g. 1000 meters) of the weather application 1402, the electronic device may measure the location of the electronic device. In this case, it may be assumed that the electronic device is located in an outdoor space and thus measures the location of the electronic device using the GPS module.

According to an embodiment of the present disclosure, the effective range of the location information corresponding to the moving distance of the electronic device may continuously increase from 2:00 PM 1426 to 2:30 PM (or 1430 military time) 1428 due to the movement of the electronic device made by the user walking to a car. In addition, the effective range of the location information corresponding to the moving distance of the electronic device may rapidly increase due to the movement of the user driving in the car after 2:30 PM 1428, as compared to the movement caused by walking. Since the effective range of the location information corresponding to the moving distance of the electronic device at 2:30 PM 1428 falls within the effective range (e.g. 100 meters) of the map application 1400, the electronic device may provide the pre-set location information to the map application 1400. Since the effective range of the location information corresponding to the moving distance of the electronic device at 3:00 (or 1500 military time) 1430 falls within the effective range (e.g. 1000 meters) of the weather application 1402, the electronic device may provide the pre-set location information to the weather application 1402.

According to an embodiment of the present disclosure, if the effective range of the location information corresponding to the moving distance of the electronic device at 3:30 PM (or 1530 military time) 1432 exceeds the effective range (e.g. 10000 meters) of the health application 1404 due to the movement of the user driving in the car, the electronic device may measure the location of the electronic device. That is, the electronic device may measure the location of the electronic device in response to a request of the health application 1404. For example, the electronic device may measure the location of the electronic device using the NLP method in the state in which the GPS module is deactivated (e.g. OFF).

According to an embodiment of the present disclosure, since the effective range of the location information corresponding to the moving distance of the electronic device at 4:00 (or 1600 military time) 1434 exceeds the effective range (e.g. 1000 meters) of the weather application 1402 due to the movement of the user driving in the car, the electronic device may measure the location of the electronic device. In this case, it may be assumed that the electronic device is located in an outdoor space and thus measures the location of the electronic device using the GPS module.

According to an embodiment of the present disclosure, a method of an electronic device may include storing location information of the electronic device in a memory of the electronic device; and, in response to a request of an application program to obtain location information, providing the location information stored in the memory to the application program based on at least part of the location information stored in the memory.

According to an embodiment of the present disclosure, providing location information to the application program may include determining whether to provide the location information stored in the memory to the application program or not based on information related to the application program and the stored location information.

According to an embodiment of the present disclosure, determining whether to provide the location information to the application program may include determining whether to provide the stored location information to the application program or not based on at least one of a state or a context of the electronic device.

According to an embodiment of the present disclosure, a method of an electronic device may include in response to a request from a first application program to obtain first location information, obtaining location information of the electronic device; storing the location information of the electronic device in a memory of the electronic device; and, in response to a request from a second application program to obtain second location information, providing the stored location information to the second application program based on at least part of the stored location information.

According to an embodiment of the present disclosure, providing the stored location information to the second application program may include determining whether to provide the location information stored in the memory to the second application program or not based on information related to the second application program and the stored location information.

According to an embodiment of the present disclosure, determining whether to provide the location information to the second application program may include determining whether to provide the stored location information to the second application program or not based on at least one of a state or a context of the electronic device.

According to an embodiment of the present disclosure, the method may further include providing the location information stored in the memory to the second application program in response to a determination that the stored location information is provided to the second application program.

According to an embodiment of the present disclosure, the method may further include measuring location information of the electronic device in response to a determination that the stored location information is not provided to the second application program; and providing the measured location information of the electronic device to the second application program.

According to an embodiment of the present disclosure, measuring the location may include determining reliability of location information matched with a network based on an effective range of location information corresponding to the application program; and, if the location information matched with the network is determined to be reliable, determining the location information matched with the network as the location of the electronic device.

According to an embodiment of the present disclosure, the method may include, if the location information matched with the network is not determined to be reliable, measuring the location of the electronic device using hardware resources.

According to an embodiment of the present disclosure, the electronic device and the method of obtaining the location thereof selectively measure the location of the electronic device based on the reliability of pre-set passive location information of the electronic device, thereby reducing the number of measurement times of the location of the electronic device and thus reducing power consumption caused by location measurement.

According to an embodiment of the present disclosure, the electronic device and the method of obtaining the location thereof measure the location of the electronic device using network information, thereby reducing the number of measurement times of the location of the electronic device and thus reducing power consumption caused by location measurement.

The embodiments disclosed herein are provided merely to describe details of the present disclosure and to facilitate understanding of the present disclosure, and are not intended to limit the scope of the present disclosure. It will be understood by those skilled in the art that various modifications in form and detail may be made therein without departing from the scope and spirit of the present disclosure as defined by the appended claims and their equivalents.

What is claimed is:
1. An electronic device, comprising:
a communication interface configured to communicate with at least one external electronic device via at least one communication scheme;
a sensor, distinct from the communication interface, configured to obtain a moving distance of the electronic device;
a memory configured to store instructions; and
a processor operably coupled to the communication interface and the memory,
wherein the processor is configured to execute the stored instructions to:
receive, from an application stored in the memory, a request requiring location information of the electronic device;
determine, in response to receiving the request, a range within which the electronic device is located, based on first information which was received from the at least one external electronic device and second information regarding a moving distance of the electronic device moved after the first information was received from the at least one external electronic device, wherein the first information includes data indicating a location of the at least one external electronic device, and wherein the moving distance of the electronic device is obtained by the sensor that is distinct from the communication interface;
determine whether the range is within a designated range for the application; and
provide, in response to determining that the range is within the designated range, a location of the electronic device that has been stored in the electronic device as the location information of the electronic device to the application.

2. The electronic device of claim 1, further comprising:
a location measurement module,
wherein the processor is further configured to execute the stored instructions to:
measure, in response to determining that the range is outside of the designated range, the location of the electronic device through the location measurement module; and
provide, in response to measuring the location of the electronic device, the measured location as the location information of the electronic device to the application.

3. The electronic device of claim 2, wherein the range is determined based on a coverage of the at least one external electronic device.

4. The electronic device of claim 3, wherein the at least one external electronic device comprises one or more of an access point (AP), a Bluetooth communication device, a base station, or a near-field communication (NFC) device, and
wherein the data includes one or more of an identifier (ID) of the AP, an ID of the Bluetooth communication device, a cell ID of the base station, a location area identity (LAI), or a mobile network code (MCC).

5. The electronic device of claim 1, further comprising:
a location measurement module,
wherein the range is further determined based on a previous location of the electronic device which has been previously measured through the location measurement module.

6. A method of an electronic device, comprising:
receiving, from an application stored in a memory of the electronic device, a request requiring location information of the electronic device;
determining, in response to the request, a range within which the electronic device is located, based on first information which was received from at least one external electronic device and second information regarding a moving distance of the electronic device moved after the first information was received from the at least one external electronic device, wherein the first information includes data indicating a location of the at least one external electronic device, and wherein the moving distance of the electronic device is obtained by a sensor of the electronic device that is distinct from a communication interface of the electronic device used for receiving the first information;
determining whether the range is within a designated range for the application; and
providing, in response to determining that the range is within the designated range, a location of the electronic device that has been stored in the electronic device as the location information of the electronic device to the application.

7. The method of claim 6, further comprising:
measuring, in response to determining that the range is outside of the designated range, the location of the electronic device through a location measurement module of the electronic device; and
provide, in response to measuring the location of the electronic device, the measured location as the location information of the electronic device to the application.

8. The method of claim 7, wherein the range is determined based on a coverage of the at least one external electronic device.

9. The method of claim 8, wherein the at least one external electronic device comprises one or more of an access point (AP), a Bluetooth communication device, a base station, or a near-field communication (NFC) device, and
wherein the data includes one or more of an identifier (ID) of the AP, an ID of the Bluetooth communication device, a cell ID of the base station, a location area identity (LAI), or a mobile network code (MCC).

10. The method of claim 6, wherein the range is further determined based on a previous location of the electronic device which has been previously measured through a location measurement module of the electronic device.

* * * * *